United States Patent
Matsumoto et al.

(10) Patent No.: US 10,718,887 B2
(45) Date of Patent: Jul. 21, 2020

(54) METHOD OF MANUFACTURING ANTIREFLECTION FILM AND ANTIREFLECTION FILM

(71) Applicant: FUJIFILM Corporation, Tokyo (JP)

(72) Inventors: Ayako Matsumoto, Kanagawa (JP); Daiki Wakizaka, Kanagawa (JP); Shuntaro Ibuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 241 days.

(21) Appl. No.: 15/883,594

(22) Filed: Jan. 30, 2018

(65) Prior Publication Data

US 2018/0156943 A1    Jun. 7, 2018

Related U.S. Application Data

(63) Continuation of application No. PCT/JP2016/071862, filed on Jul. 26, 2016.

(30) Foreign Application Priority Data

Jul. 31, 2015   (JP) .................................. 2015-152580

(51) Int. Cl.
*G02B 27/00* (2006.01)
*G02B 1/118* (2015.01)
(Continued)

(52) U.S. Cl.
CPC ................ *G02B 1/118* (2013.01); *B32B 3/26* (2013.01); *B32B 3/30* (2013.01); *B32B 7/02* (2013.01);
(Continued)

(58) Field of Classification Search
CPC ... G02B 1/04; G02B 1/11; G02B 1/14; G02B 1/111; G02B 1/113; G02B 1/118;
(Continued)

(56) References Cited

U.S. PATENT DOCUMENTS

2010/0177398 A1* 7/2010 Watanabe .............. G02B 1/105
359/614
2011/0267698 A1   11/2011 Guilfoyle et al.
(Continued)

FOREIGN PATENT DOCUMENTS

CN     103534220 A    1/2014
CN     105793739 A    7/2016
(Continued)

OTHER PUBLICATIONS

Office Action, issued by the State intellectual Property Office dated Mar. 29, 2019, in connection with Chinese Patent Application No. 201680045143.1.
(Continued)

*Primary Examiner* — Mustak Choudhury
(74) *Attorney, Agent, or Firm* — Jean C. Edwards, Esq.; Edwards Neils LLC

(57) ABSTRACT

The present invention provides a method of manufacturing an antireflection film, including the successive steps of: applying a composition including a curable compound (a1), a plurality of particles (a2), and a solvent on a substrate, and volatilizing the solvent to provide a layer (a), the layer (a) having a portion in which the particles (a2) do not exist, and the portion having a thickness being 0.8 times the average primary particle diameter of the particles (a2) or greater; curing a portion of the curable compound (a1); causing a portion of the curable compound (a1) to permeate the substrate or to be volatilized so as to form an uneven shape; and curing the curable compound (a1) remained in the layer (a).

16 Claims, 2 Drawing Sheets

(51) Int. Cl.
*B32B 7/02* (2019.01)
*G02B 1/14* (2015.01)
*B32B 3/26* (2006.01)
*B32B 27/20* (2006.01)
*B32B 3/30* (2006.01)
*B32B 27/06* (2006.01)
*G02B 1/04* (2006.01)
*B05D 5/06* (2006.01)
*B05D 3/06* (2006.01)
*B05D 3/02* (2006.01)
*B05D 1/28* (2006.01)

(52) U.S. Cl.
CPC .............. *B32B 27/06* (2013.01); *B32B 27/20* (2013.01); *G02B 1/04* (2013.01); *G02B 1/14* (2015.01); *B05D 1/28* (2013.01); *B05D 3/0209* (2013.01); *B05D 3/0254* (2013.01); *B05D 3/065* (2013.01); *B05D 5/06* (2013.01); *B05D 2518/10* (2013.01); *B05D 2601/22* (2013.01); *B32B 2307/40* (2013.01); *B32B 2307/538* (2013.01)

(58) Field of Classification Search
CPC .. B32B 3/26; B32B 3/30; B32B 27/06; B32B 27/20; B32B 7/02; B32B 2307/40; B32B 2307/538; B32B 2307/416; B32B 17/068; B32B 27/32; B32B 27/36; B32B 27/365; B32B 7/12; B32B 27/302; B32B 2250/03; B32B 2307/584; B32B 2255/24; B32B 2255/26; B32B 2255/28; B32B 2307/536; B32B 2307/732; B32B 2255/20; B32B 2250/24; B32B 2307/558; B32B 2457/202; B32B 27/08; B32B 23/08; B32B 27/40; B05D 5/06; B05D 5/061; B05D 2601/22; B05D 3/065; B05D 3/0254; B05D 3/0209; B05D 1/28; B05D 2518/10; B05D 1/08; B05D 1/10; B05D 1/18; B05D 1/36; C03C 3/087; C03C 3/093; C03C 15/00; C03C 17/00; C03C 17/006–009; C03C 17/42; C03C 17/3417; B44C 1/227; B44C 1/228
USPC ......... 359/601–614; 427/161, 162, 189–193, 427/452, 554, 580; 428/143–149, 206, 428/212, 216, 323, 428
See application file for complete search history.

(56) References Cited

U.S. PATENT DOCUMENTS

| | | |
|---|---|---|
| 2012/0134024 A1 | 5/2012 | Lander et al. |
| 2012/0281292 A1 | 11/2012 | Baca et al. |
| 2013/0107370 A1 | 5/2013 | Lander et al. |
| 2013/0115441 A1 | 5/2013 | Bookbinder et al. |
| 2013/0323468 A1 | 12/2013 | Myers et al. |
| 2015/0062713 A1 | 3/2015 | Hart et al. |
| 2015/0064405 A1* | 3/2015 | Koch, III .............. G02B 1/118 428/147 |
| 2015/0175478 A1 | 6/2015 | Ravichandran et al. |
| 2015/0198752 A1 | 7/2015 | Lander et al. |
| 2015/0299035 A1* | 10/2015 | Kuksenkov .......... C03C 17/007 359/603 |
| 2016/0077240 A1 | 3/2016 | Asahi et al. |
| 2016/0216410 A1 | 7/2016 | Asahi et al. |
| 2016/0355689 A1 | 12/2016 | Lander et al. |

FOREIGN PATENT DOCUMENTS

| | | |
|---|---|---|
| JP | 07-198904 A | 8/1995 |
| JP | 2000-256040 A | 9/2000 |
| JP | 2006-003453 A | 1/2006 |
| JP | 2009-139796 A | 6/2009 |
| JP | 2012-145748 A | 8/2012 |
| JP | 2014-235259 A | 12/2014 |
| TW | 2015-01924 A | 1/2015 |
| WO | 2014/185314 A1 | 11/2014 |
| WO | 2015/050017 A1 | 4/2015 |

OTHER PUBLICATIONS

International Search Report issued in PCT/JP2016/071862 dated Nov. 1, 2016.
Written Opinion issued in PCT/JP2016/071862 dated Nov. 1, 2016.
International Preliminary Report on Patentability completed by WIPO dated Feb. 15, 2018, in connection with International Patent Application No. PCT/JP2016/071862.
Notification of Reasons for Refusal issued by the Japanese Patent Office dated May 15, 2018 in connection with Japanese Patent Application No. 2017-532516.
Notification of Reasons for Refusal issued by the Korean intellectual Property Office dated Feb. 18, 2019, in connection with Korean Patent Application No. 10-2018-7002923.

* cited by examiner

METHOD OF MANUFACTURING ANTIREFLECTION FILM AND ANTIREFLECTION FILM

CROSS-REFERENCE TO RELATED APPLICATIONS

This is a continuation of International Application No. PCT/JP2016/071862 filed on Jul. 26, 2016, which was published under Article 21(2) in Japanese, and which claims priority under 35 U.S.C. § 119(a) from Japanese Patent Application No. 2015-152580 filed on Jul. 31, 2015. The above applications are hereby expressly incorporated by reference in their entirety, into the present application.

BACKGROUND OF THE INVENTION

1. Field of the Invention

The present invention relates to a method of manufacturing an antireflection film and an antireflection film.

2. Description of the Related Art

In an image display device such as a cathode ray tube display (CRT), a plasma display (PDP), an electroluminescent display (ELD), a vacuum fluorescent display (VFD), a field emission display (FED), and a liquid crystal display device (LCD), an antireflection film may be provided in order to prevent decrease in contrast due to reflection of external light on a display surface and reflected glare of an image. In addition to the image display device, the antireflection function may be provided to a glass surface of the showroom or the like by an antireflection film.

As the antireflection film, an antireflection film having a fine uneven shape with a period equal to or less than the wavelength of visible light on the surface of a substrate, that is, an antireflection film having a so-called moth eye structure is known. The moth eye structure makes a refractive index gradient layer in which the refractive index successively changes in a pseudo manner from the air toward the bulk material inside the substrate, and reflection of the light can be prevented.

As an antireflection film having a moth eye structure, JP2009-139796A discloses the antireflection film having a moth eye structure manufactured by a method of coating a transparent substrate with a coating liquid containing a transparent resin monomer and a fine particle, curing the coating liquid, forming a transparent resin in which a fine particle is dispersed, and then etching the transparent resin.

SUMMARY OF THE INVENTION

However, in the technique of JP2009-139796A, the transparent resin is required to be etched, and a step of manufacturing the antireflection film becomes complicated in some cases.

Particularly, considering application to an image display device used outdoors such as a smartphone or a tablet personal computer (PC), an antireflection film excellent in black tightness is required even in a bright environment.

An object of the present invention is to provide a method capable of easily producing an antireflection film in which antireflection performance is satisfactory, scratch resistance is excellent, muddiness is little, and black tightness is excellent even in a bright environment and this antireflection film.

In order to solve the above problems, the inventors of the present invention conducted research of forming an uneven shape which is a moth eye structure by applying a composition containing a particle, a curable compound, and a solvent. However, in a case where the particle is exposed to the air interface during the period from coating to curing, the particle easily aggregates, and muddiness is caused in some cases. Then, the inventors of the present invention further conducted research to find a method of forming a satisfactory uneven shape with a particle by setting the film thickness of a portion in which the particle of the coated layer does not exist to a specific range, curing a portion of the curable compound such that the particle do not move, and causing an uncured portion to permeate the substrate or removing an uncured portion by volatilization.

That is, the present inventors have found that the above object can be achieved by the following means.

[1] A method of manufacturing an antireflection film, comprising the successive steps of:

(1) a step of applying a composition including a curable compound (a1), a plurality of particles (a2) having an average primary particle diameter of 150 nm to 250 nm, and a solvent on a substrate, and volatilizing the solvent, to provide a layer (a), the layer (a) having a portion in which the particles (a2) do not exist, and the portion having a thickness being 0.8 times the average primary particle diameter of the particles (a2) or greater;

a step (2) of curing a portion of the curable compound (a1) in the layer (a) to obtain a cured compound (a1c);

a step (3) of causing a portion of a compound selected from the group consisting of the curable compound (a1) and the compound (a1c) in the layer (a) to permeate the substrate by heating or to be volatilized so as to form an uneven shape on a surface of the layer (a); and a step (4) of curing the curable compound (a1) that remains in the layer (a).

[2] The method of manufacturing an antireflection film according to [1], in which, after the step (4), the particles (a2) do not align in a direction orthogonal to a surface of the substrate.

[3] The method of manufacturing an antireflection film according to [1] or [2], in which the condition of curing a portion of the curable compound (a1) in the step (2) is a condition in which 2% to 20% of a composition being removed the particles (a2) from the composition and being applied on the substrate in a thickness of 2 μm, is cured.

[4] The method of manufacturing an antireflection film according to any one of [1] to [3], in which, the curing a portion of the curable compound (a1) in the step (2) is performed by irradiating with ultraviolet rays from a side of the surface opposite to a side having the layer (a) of the substrate.

[5] The method of manufacturing an antireflection film according to any one of [1] to [4], in which the curable compound (a1) is a compound having two or more (meth) acryloyl groups in one molecule.

[6] The method of manufacturing an antireflection film according to any one of [1] to [5], in which the particles (a2) are metal oxide particles.

[7] The method of manufacturing an antireflection film according to any one of [1] to [6], in which a heating temperature in a case of permeation by heating of the step (3) is 60° C. to 150° C.

[8] The method of manufacturing an antireflection film according to [7], in which a heating time during the heating is 1 to 15 minutes.

[9] The method of manufacturing an antireflection film according to any one of [1] to [8], further comprising:

a step (B1) of providing a layer (b) including a compound (b1) incompatible with the curable compound (a1) on a surface of the layer (a) opposite to a surface on the substrate side between the step (1) and the step (2), between the step (2) and the step (3), or between the step (3) and the step (4); and a step (B2) of removing the layer (b) after the step (B1).

[10] The method of manufacturing an antireflection film according to [9], in which the compound (b1) is an oil component which is a liquid at 50° C.

[11] The method of manufacturing an antireflection film according to [9] or [10], in which the compound (b1) is a silicone-based oil component, a hydrocarbon-based oil component, an ester-based oil component, natural animal fats, natural vegetable oils, semisynthetic oils and fats, higher fatty acid, higher alcohol, or a fluorine-based oil component.

[12] The method of manufacturing an antireflection film according to any one of [1] to [11], in which the substrate has a hard coat layer and the composition in the step (1) is applied on the hard coat layer.

[13] The method of manufacturing an antireflection film according to [12], in which the hard coat layer is formed by curing a hard coat layer forming composition containing a curable compound, and an increase amount of a curing rate of the hard coat layer forming composition due to curing of the step (2) is less than 5%.

[14] The method of manufacturing an antireflection film according to [13], in which at least two kinds of curable compounds are used as the curable compound (a1), and at least one kind thereof is a compound that permeates the substrate in the step (3), does not have a radical reactive group, and has a reactive group other than a radical reactive group.

[15] An antireflection film manufactured by the method of manufacturing an antireflection film according to any one of [1] to [14].

[16] An antireflection film comprising:

a substrate; and an antireflection layer having an uneven shape on a surface, in which the antireflection layer contains a resin that forms a recessed part of the uneven shape and a plurality of particles having an average primary particle diameter of 150 nm to 250 nm that forms a protrusion, in which an average surface roughness Ra of the uneven shape of the antireflection layer measured by using an atomic force microscope is 15 nm or greater, in which, in a cross section of the antireflection film in a film thickness direction, an angle θ formed by a straight line perpendicular to the substrate that passes through a point P at which one of the particles, the resin, and an air interface intersect with each other and a tangent line of a curve formed by the resin and the air interface at the point P is 5° or greater, and in which, in the antireflection film, a difference between an integrated reflectance and a specular reflectance in a wavelength range of 450 nm to 650 nm is 0.6% or less.

According to the present invention, it is possible to provide a method capable of easily producing an antireflection film in which antireflection performance is satisfactory, scratch resistance is excellent, muddiness is little, and black tightness is excellent even in a bright environment and this antireflection film.

BRIEF DESCRIPTION OF THE DRAWINGS

FIG. 2A is a schematic view illustrating a cross section of an example of an antireflection film of the present invention in a film thickness direction, and FIG. 2B is a schematic view illustrating a cross section of an example of an antireflection film manufactured by etching in a film thickness direction.

DESCRIPTION OF THE PREFERRED EMBODIMENTS

Hereinafter, preferable embodiments according to the present invention are described in detail. The constituents in the following description will be explained based on typical embodiments of the present invention, but the present invention is not limited to the embodiments.

"(Meth)acrylate" refers to at least one of acrylate or methacrylate, "(meth)acryl" refers to at least one of acryl or methacryl, and "(meth)acryloyl" refers to at least one of acryloyl or methacryloyl.

[Method of Manufacturing Antireflection Film]

The method of manufacturing an antireflection film of the present invention is a method of manufacturing an antireflection film sequentially including: (1) a step of coating a substrate with a composition including a curable compound (a1), a plurality of particles (a2) having an average primary particle diameter of 150 nm to 250 nm, and a solvent, volatilizing the solvent, and providing a layer (a) in which a thickness in a portion in which the particle (a2) does not exist is 0.8 times of an average primary particle diameter of the particles (a2) or greater; a step (2) of curing a portion of the curable compound (a1) in the layer (a) to obtain a cured compound (a1c); a step (3) of causing a portion of a compound selected from the group consisting of the curable compound (a1) and the compound (a1c) in the layer (a) to permeate the substrate by heating or to be volatilized so as to form an uneven shape on a surface of the layer (a), and a step (4) of curing the curable compound (a1) that remains in the layer (a).

Figure 1:
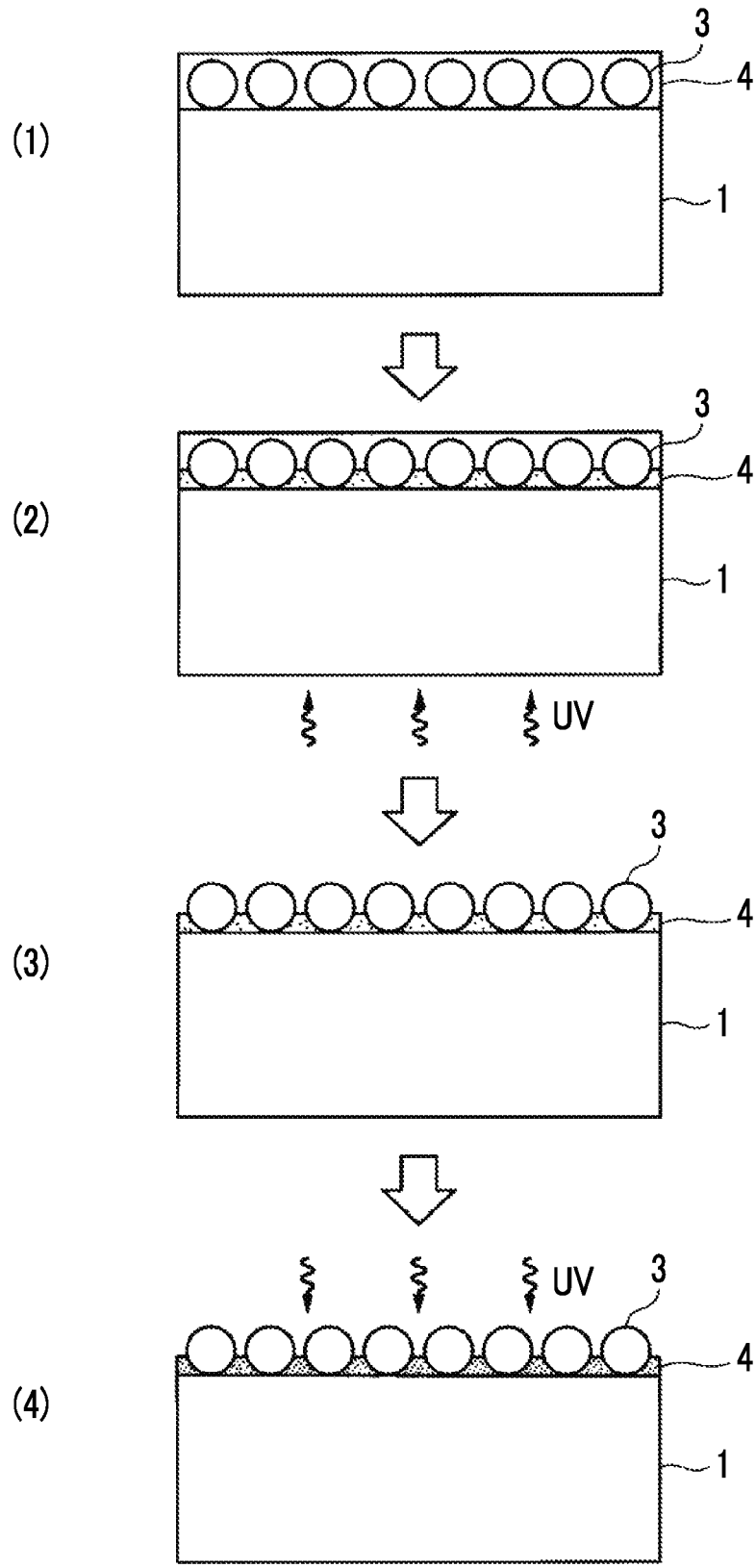
FIG. 1 is a schematic view illustrating an example of a method of manufacturing an antireflection film of the present invention.

A schematic view illustrating an example of a method of manufacturing an antireflection film according to the present invention is illustrated in FIG. 1.

[Step (1)]

The step (1) is a step of coating a substrate (reference numeral 1 in FIG. 1) with a composition including a curable compound (a1), a plurality of particles (a2) (reference numeral 3 of FIG. 1) having an average primary particle diameter of 150 nm to 250 nm, and a solvent, volatilizing the solvent, and providing a layer (a) (reference numeral 4 in FIG. 1) in which a thickness of a thickness in a portion in which the particle (a2) does not exist is 0.8 times of an average primary particle diameter of the particle (a2) or greater.

(Substrate)

The substrate is not particularly limited, as long as the substrate is a substrate having light transmittance that is generally used as a substrate of an antireflection film, but a plastic substrate or a glass substrate is preferable.

As the plastic substrate, various kinds thereof may be used. Examples thereof include a substrate containing a cellulose-based resin: cellulose acylate (triacetate cellulose, diacetyl cellulose, and acetate butyrate cellulose) and the like; a polyester resin: polyethylene terephthalate and the like, a (meth)acrylic resin, a polyurethane-based resin, polycarbonate, polystyrene, an olefin-based resin, and the like. A substrate containing cellulose acylate, polyethylene terephthalate, or a (meth)acrylic resin is preferable, a substrate containing cellulose acylate is more preferable, and a cellulose acylate film is particularly preferable. As cellulose acylate, substrates disclosed in JP2012-093723A and the like can be preferably used.

The thickness of the substrate is usually about 10 μm to 1,000 μm. However, in view of satisfactory handleability, high light transmittance, and sufficient strength, the thickness is preferably 20 μm to 200 μm and more preferably 25 μm to 100 μm.

As the light transmitting properties of the substrate, it is preferable that a transmittance of visible light (preferably an average transmittance of 400 nm to 750 nm) is 90% or greater.

According to the present invention, before the step (1), a functional layer may be provided on the substrate. In a case where a functional layer is provided on the substrate, a laminate of the functional layer and the substrate is called a "substrate". In a case where a functional layer is provided on a surface on which the layer (a) of the substrate is to be provided, the layer (a) is provided on the functional layer in the step (1) and subsequent steps are performed. As the functional layer, a hard coat layer is preferable.

According to the present invention, the substrate is a substrate having a hard coat layer (also referred to as a "substrate with a hard coat layer"), and the hard coat layer is preferably coated with the composition in the step (1).

(Composition for Forming Antireflection Layer)

A method of performing coating with a composition (also referred to as a "composition for forming an antireflection layer") including the curable compound (a1), the particles (a2) having an average primary particle diameter of 150 nm to 250 nm, and a solvent is not particularly limited, and well-known methods can be used. Examples thereof include a dip coating method, an air knife coating method, a curtain coating method, a roller coating method, a wire bar coating method, a gravure coating method, and a die coating method.

<Curable Compound (a1)>

The curable compound (a1) is preferably a compound having a radical reactive group. Examples of the radical reactive group include an addition polymerizable unsaturated bond (for example, a (meth)acryloyl group, a (meth)acrylamide group, a (meth)acrylonitrile group, an allyl group, a vinyl group, a styrene structure, a vinyl ether structure, and an acetylene structure), —SH, —PH, SiH, —GeH, and a disulfide structure.

Examples of the curable compound (a1) include a compound having a polymerizable functional group (polymerizable carbon-carbon unsaturated double bond) such as a (meth)acryloyl group, a vinyl group, a styryl group, and an allyl group. Among these, a compound having a (meth) acryloyl group and —C(O)OCH=CH$_2$ is preferable, a compound having a (meth)acryloyl group is more preferable, and a compound having two or more (meth)acryloyl groups in one molecule is even more preferable.

The curable compound (a1) may be used singly or two or more kinds of the compound may be used in combination.

Particularly, in a case where the substrate with the hard coat layer is used as the substrate, at least two curable compounds are used as the curable compound (a1), at least one kind thereof is a compound that permeate the substrate (more specifically, the hard coat layer) in the step (3), and it is preferable to not have a radical reactive group and to have a reactive group other than a radical reactive group.

Specific examples of the compound having a polymerizable functional group include (meth)acrylic acid diesters of alkylene glycol, (meth)acrylic acid diesters of polyoxyalkylene glycol, (meth)acrylic acid diesters of polyhydric alcohol. (meth)acrylic acid diesters of an ethylene oxide or propylene oxide adduct, epoxy (meth)acrylates, urethane (meth)acrylates, and polyester (meth)acrylates.

Examples of the curable compound (a1) include the curable compounds (a1-1) to (a1-3), it is preferable to use two of these in combination, and it is more preferable to use three of these in combination.

Curable compound (a1-1): Compound having a molecular weight of 400 or greater and having a radical reactive group Curable compound (a1-2): Silane coupling agent having a radical reactive group Curable compound (a1-3): Compound having a molecular weight of less than 400, having not a radical reactive group, and having a reactive group other than a radical reactive group or compound having a molecular weight of less than 400 and volatilized during heating The curable compound molecular weight is obtained from a structural formula in a case of being primarily obtained from the structural formula of the curable compound. In a case where the curable compound molecular weight may not be primarily obtained from the structural formula, for example, the curable compound has distribution like a polymer compound, the curable compound molecular weight is a weight-average molecular weight measured by using the gel permeation chromatography.

The weight-average molecular weight according to the present invention is a value measured in the following conditions by the gel permeation chromatography (GPC).

[Solvent] Tetrahydrofuran
[Name of device] TOSOH HLC-8220GPC
[Column] Three items of TOSOH TSKgel Super HZM-H (4.6 mm×15 cm) are connected to be used.
[Column temperature] 25° C.
[Sample concentration] 0.1 mass %
[Flow rate] 0.35 ml/min
[Calibration Curve] A calibration curve with seven samples of TSK standard polystyrene manufactured by TOSOH Corporation weight-average molecular weight (Mw)=2,800,000 to 1,050 is used.

Curable compound (a1-1) is a compound having a molecular weight of 400 or greater and having a radical reactive group.

The curable compound (a1-1) is preferably a compound that hardly permeates the substrate.

The molecular weight of the curable compound (a1-1) is preferably 400 to 100,000 and more preferably 1,000 to 50,000.

In the curable compound (a1-1), a functional group equivalent represented by (molecular weight/radical reactive group amount) is preferably 1,000 or less, more preferably 500 or less, and even more preferably 200 or less.

Specific examples of the curable compound (a1-1) include an esterification product of polyol and (meth) acrylic acid such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, and KAYARAD GPO-303 (manufactured by Nippon Kayaku Co., Ltd.), NK ESTER A-TMPT, A-TMMT, A-TMM3, A-TMM3L, and A-9550 (manufactured by Shin Nakamura Chemical Co., Ltd.), and V#3PA, V#400, V#36095D, V#1000, V#1080, and VISCOAT#802 (manufactured by Osaka Organic Chemical Industry Ltd.), and a dendrimer-type polyfunctional acrylate such as Sirius-501 and SUBARU-501 (manufactured by Osaka Organic Chemical Industry Ltd.). A trifunctional or higher functional urethane acrylate compound such as SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B. SHIKOH UV-2250EA, SHIKOH UV-2750B (manufactured by Nippon Synthetic Chem Industry Co., Ltd.), UL-503LN (manufactured by Kvoeisha Chemical Co., Ltd.), UNIDIC 17-806, UNIDIC 17-813, UNIDIC V-4030, and UNIDIC V-4000BA (manufactured by DIC Corporation), EB-1290K, EB-220, EB-5129, EB-1830, and EB-4858 (manufactured by Daicel-UCB Corporation), HIGH-COAP AU-2010 and UNIDIC AU-2020 (manufactured by Tokushiki Co., Ltd.), ARONIX M-1960 (manufactured by Toagosei Co., Ltd.), and ARTRESIN UN-3320HA. UN-3320HC, UN-3320HS, and UN-904 (manufactured by Negami Chemical Industrial Co., Ltd.), NK OLIGO U-4HA and U-15HA (manufactured by Shin Nakamura Chemical Co., Ltd.) and a trifunctional or higher functional polyester compound such as ARONIX M-8100, M-8030, and M-9050 (manufactured by Toagosei Co., Ltd.), and KRM-8307 (manufactured by Daicel Cytec Co., Ltd.) can be suitably used.

The curable compound (a1-2) is a silane coupling agent having a radical reactive group.

The molecular weight of the curable compound (a1-2) is preferably 100 to 5,000 and more preferably 200 to 2,000.

The curable compound (a1-2) is preferably a compound that hardly permeates the substrate.

In the curable compound (a1-2), a functional group equivalent represented by (molecular weight/radical reactive group amount) is preferably 1,000 or less, more preferably 800 or less, and even more preferably 400 or less.

Specific examples of the curable compound (a1-2) include 3-(meth)acryloxypropyltrimethoxysilane, 3-(meth)acryloxypropylmethyldimethoxysilane, 3-(meth)acryloxypropyldimethylmethoxysilane, 3-(meth)acryloxypropylmethyldiethoxysilane, 3-(meth)acryloxypropyl triethoxysilane, 2-(meth)acryloxyethyltrimethoxysilane, 2-(meth)acryloxyethyltriethoxysilane, 4-(meth)acryloxybutyltrimethoxysilane, and 4-(meth)acryloxybutyltriethoxysilane. Specifically, KBM-503 and KBM-5103 (manufactured by Shin-Etsu Chemical Co., Ltd.) or silane coupling agents X-12-1048, X-12-1049, and X-12-1050 (manufactured by Shin-Etsu Chemical Co., Ltd.) disclosed in JP2014-123091A and the like can be used.

In a case where the curable compound (a1-3) permeates the substrate, the curable compound (a1-3) is preferably a compound having a molecular weight of less than 400, not having a radical reactive group, and having a reactive group other than a radical reactive group.

The curable compound (a1-3) is preferably a compound that hardly permeates the substrate at 25° C. and easily permeates to the substrate during heating.

The reactive group other than a radical reactive group included in the curable compound (a1-3) is preferably a group that reacts with a compound forming the substrate (a functional layer in a case where the substrate has a functional layer such as a hard coat layer), and examples thereof include an epoxy group, an amino group, a boronic acid group, a boronic acid ester group, an oxiranyl group, an oxetanyl group, a hydroxyl group, a carboxyl group, and an isocyanate group.

The molecular weight of the curable compound (a1-3) is preferably 100 or greater and less than 400 and more preferably 200 to 300.

The curable compound (a1-3) preferably has two or more reactive groups other than the radical reactive group.

Specific examples of the curable compound (a1-3) include CELOXIDE 2021P and CELOXIDE 2081, EPOLEAD GT-301, EPOLEAD GT-401, and EHPE3150CE (above are manufactured by Daicel Corporation), OXT-121, OXT-221, OX-SQ, and PNOX-1009 (above, Toagosei Co., Ltd.), and KBM-303, KBM-402, KBM-403, KBE-402, KBE-403, and KBM-4803 (above, manufactured by Shin-Etsu Chemical Co., Ltd.).

The curable compound (a1-3) may be a compound that is volatilized during heating. In this case, the molecular weight is preferably less than 400, more preferably less than 300. Since the compound is hardly volatilized at room temperature and is easily volatilized during heating, the molecular weight is even more preferably 50 or greater and less than 300 and particularly preferably 100 or greater than less than 200. In a case where the curable compound (a1-3) is a compound that is volatilized during heating, the curable compound (a1-3) may or may not include a reactive group.

Specific examples of the curable compound (a1-3) include BLEMMER GMR (manufactured by NOF Corporation), BLEMMER GML (manufactured by NOF Corporation), and 2-hydroxyethyl methacrylate (HEMA).

The content of the curable compound (a1) included in the layer (a) of the step (1) is preferably 0.1 $g/m^2$ to 0.8 $g/m^2$, more preferably 0.1 $mg/m^2$ to 0.6 $mg/m^2$, and most preferably 0.1 $g/m^2$ to 0.4 $mg/m^2$.

<Particles (a2) Having Average Primary Particle Diameter of 150 nm to 250 nm>

The particles (a2) having an average primary particle diameter of 150 nm to 250 nm are referred to as the "particles (a2)".

Examples of the particles (a2) include a metal oxide particle, resin particle, and an organic-inorganic hybrid particle having a core of a metal oxide particle and a shell of a resin. In view of excellent film hardness, the metal oxide particle is preferable.

Examples of the metal oxide particle include a silica particle, a titania particle, a zirconia particle, and an antimony pentoxide particle. Since the refractive index is close to many resins, haze is hardly generated and the moth eye structure is easily formed. Therefore, a silica particle is preferable.

Examples of the resin particle include a polymethyl methacrylate particle, a polystyrene particle, and a melamine particle.

In order to cause particles to be arranged to form a moth eye structure, an average primary particle diameter of the particles (a2) is 150 nm to 250 nm and preferably 170 nm to 220 nm.

Only one kind of the particles (a2) may be used singly, or two or more kinds of particles having different average primary particle diameters may be used.

The average primary particle diameter of the particle refers to the cumulative 50% particle diameter of the volume-average particle diameter.

More specifically, particles are added to ethanol so as to have a content of 35 mass %, are dispersed for 10 minutes or longer by ultrasonic waves to prepare a dispersion liquid of the particles, and the dispersion liquid can be measured by electron micrograph. A scanning electron microscope (SEM) image is photographed by adding dropwise the dispersion liquid, the diameter of each of the 100 primary particles is measured to calculate the volume, and the cumulative 50% particle diameter can be set as the average primary particle diameter. In a case where the particle does not have a spherical shape, the average value of the long diameter and the short diameter is regarded as the diameter of the primary particle.

A shape of the particle is most preferably a spherical shape, but may be a shape other than a spherical shape such as an amorphous shape. The particle may be any one of crystalline and amorphous.

As the particle, a surface-treated inorganic fine particle is preferably used for improving the dispersibility in the coating liquid, improving the film hardness, and preventing aggregation. Specific examples and preferable examples of the surface treatment method are the same as those described in [0119] to [0147] of JP2007-298974A.

Particularly, in view of providing the binding properties to the resin and improving the film hardness, it is preferable that the surface of the particle is surface-modified with a compound having a functional group having reactivity with an unsaturated double bond and the particle surface, and an unsaturated double bond is applied to the particle surface.

Specific examples of the particle having an average primary particle diameter of 150 nm to 250 nm include SEAHOSTAR KE-P10 (amorphous silica manufactured by Nippon Shokubai Co., Ltd. having an average primary particle diameter of 150 nm), EPOSTAR S (a melamine/formaldehyde condensate manufactured by Nippon Shokubai Co., Ltd. having an average primary particle diameter of 200 nm), EPOSTAR MA-MX100W (a polymethylmethacrylate (PMMA) crosslinked product manufactured by Nippon Shokubai Co., Ltd. having an average primary particle diameter of 175 nm), and the like can be preferably used.

Since the amount of hydroxyl groups on the surface is moderately large and the particle is hard, the particles (a2) is particularly preferably a calcined silica particle.

The calcined silica particle can be manufactured by a well-known technique of hydrolyzing and condensing a hydrolyzable silicon compound in an organic solvent including water and a catalyst to obtain a silica particle and calcining the silica particle, and, for example, JP2003-176121A and JP2008-137854A can be referred to.

The silicon compound as a raw material for manufacturing the calcined silica particle is not particularly limited, and examples thereof include a chlorosilane compound such as tetrachlorosilane, methyltrichlorosilane, phenyltrichlorosilane, dimethyldichlorosilane, diphenyldichlorosilane, methyl vinyl dichlorosilane, trimethylchlorosilane, and methyl diphenylchlorosilane; an alkoxysilane compound such as tetramethoxysilane, tetraethoxysilane, tetraisopropoxysilane, tetrabutoxysilane, methyltrimethoxysilane, methyltriethoxysilane, trimethoxyvinylsilane, triethoxyvinylsilane, 3-glycidoxypropyltrimethoxysilane, 3-chloropropyltrimethoxysilane, 3-mercaptopropyltrimethoxysilane, 3-(2-aminoethylamino) propyltrimethoxysilane, phenyltrimethoxysilane, phenyltriethoxysilane, dimethyl dimethoxysilane, dimethyl diethoxysilane, 3-glycidoxypropylmethyldimethoxysilane, 3-glycidoxypropylmethyldiethoxysilane, 3-chloropropylmethyldimethoxysilane, diphenyldimethoxysilane, diphenyldiethoxysilane, dimethoxydiethoxysilane, trimethylmethoxysilane, and trimethylethoxysilane; an acyloxysilane compound such as tetraacetoxysilane, methyl triacetoxysilane, phenyl triacetoxysilane, dimethyl diacetoxysilane, diphenyl diacetoxysilane, and trimethylacetoxysilane; and a silanol compound such as dimethylsilanediol, diphenylsilanediol, and trimethylsilanol. Among the exemplary silane compounds, an alkoxysilane compound is particularly preferable, since alkoxysilane compound can be obtained more easily and halogen atoms as impurities in the obtained calcined silica particle are not included. As a preferred embodiment of the calcined silica particle according to the present invention, it is preferable that the content of halogen atoms is substantially 0%, and halogen atoms are not detected.

The calcining temperature is not particularly limited, but is preferably 800° C. to 1,300° C. and more preferably 1,000° C. to 1,200° C.

The content of the particle in the layer (a) in the step (1) is preferably 0.10 to 0.30 g/m$^2$, more preferably 0.14 to 0.24 g/m$^2$, and even more preferably 0.16 to 0.20 g/m$^2$. In a case where the coating amount is 0.10 g/m$^2$ or greater, a large number of protrusions of the moth eye structure can be formed, and thus the antireflection properties are more easily improved. In a case where the coating amount is 0.30 g/m$^2$ or less, aggregation in the liquid hardly occurs and a moth eye structure is easily formed in a satisfactory manner.

<Solvent>

In view of improving the dispersibility, it is preferable to select a solvent having a polarity close to that of the particles (a2). Specifically, for example, in a case where the particles (a2) is a metal oxide particle, an alcohol-based solvent is preferable, and examples thereof include methanol, ethanol, 2-propanol, 1-propanol, and butanol. For example, in a case where the particles (a2) is a metal resin particle subjected to hydrophobic surface modification, ketone-based, ester-based, carbonate-based, alkane, aromatic solvents, and the like are preferable, and examples thereof include methyl ethyl ketone (MEK), dimethyl carbonate, methyl acetate, acetone, methylene chloride, and cyclohexanone. A plurality of these solvents may be mixed to be used without remarkably deteriorating the dispersibility.

The antireflection layer forming composition may contain a component in addition to the curable compound (a1), the particles (a2), and the solvent, and examples thereof include a solvent, a polymerization initiator, a dispersing agent of the particles (a2), a leveling agent, and an antifouling agent.

<Dispersing Agent of Particles (a2)>

The dispersing agent of the particles (a2) lowers the cohesive force between the particles such that the particles (a2) is uniformly arranged. The dispersing agent is not particularly limited, but an anionic compound such as sulfuric acid salt and phosphoric acid salt, a cationic compound such as aliphatic amine salt and quaternary ammonium salt, a nonionic compound, and a polymer compound are preferable, and a polymer compound is more preferable since the polymer compound has a high degree of freedom in selecting adsorptive groups and steric repulsive groups. As the dispersing agent, a commercially available product may be used. Examples thereof include DISPERBYK160, DISPERBYK161, DISPERBYK162, DISPERBYK63, DISPERBYK164, DISPERBYK166, DISPERBYK167, DISPERBYK171, DISPERBYK180, DISPERBYK182, DISPERBYK2000, DISPERBYK2001, DISPERBYK2164, Bykumen, BYK-2009, BYK-P104, BYK-P104S, BYK-220S, Anti-Terra203, Anti-Terra204, and Anti-Terra205 (all are trade names) manufactured by BYK Japan KK.

<Leveling Agent>

The leveling agent lowers the surface tension of the antireflection layer forming composition, such that the liquid after coating is stabilized and the curable compound (a1) and the particles (a2) are easily arranged in a uniform manner. For example, compounds disclosed in JP2004-331812A and JP 2004-163610A can be used.

<Antifouling Agent>

The antifouling agent provides water and oil repelling properties to the moth eye structure, such that adhesion of dirt and fingerprints can be suppressed. For example, compounds disclosed in JP2012-88699A can be used.

<Polymerization Initiator>

The antireflection layer forming composition preferably includes a polymerization initiator and more preferably includes a photopolymerization initiator.

Examples of the photopolymerization initiator include acetophenones, benzoins, benzophenones, phosphine oxides, ketals, anthraquinones, thioxanthones, an azo compound, peroxides, 2,3-dialkyldione compounds, disulfide compounds, fluoroamine compounds, aromatic sulfoniums, lophine dimers, onium salts, borate salts, active esters, active halogens, an inorganic complex, and coumarins. Specific examples, preferable embodiments, commercially available products and the like of the photopolymerization initiator are disclosed in paragraphs [0133] to 101511 of JP2009-098658A. and can be suitably used in the present invention in the same manner.

Various examples are provided in "Newest UV curing technology" {Technical Information Institute Co. Ltd.} (1991), page 159 and "Ultraviolet Curing System" written by Kiyomi KATO (published in 1989 by The Integrated Technology Center), pages 65 to 148, and are useful for the present invention.

In order to set the content of the polymerization initiator to be sufficiently large for polymerizing the polymerizable compound included in the antireflection layer forming composition and sufficiently small so as not to increase the starting point too much, the content of the polymerization initiator is preferably 0.5 to 8 mass % and more preferably 1 to 5 mass % with respect to the solid content in the antireflection layer forming composition.

(Layer (a))

The layer (a) is a layer in which the solvent can be volatilized from the antireflection layer forming composition applied to the substrate and which includes the curable compound (a1) and the particles (a2) having an average primary particle diameter of 150 nm to 250 nm.

The layer (a) is a layer that becomes an antireflection layer in the antireflection film (also referred to as a "completed antireflection film") manufactured by the manufacturing method of the present invention.

The curable compound (a1) included in the layer (a) is cured to become a resin. This resin forms a recessed part of an uneven shape of the antireflection layer.

The particles (a2) having an average primary particle diameter of 150 nm to 250 nm included in the layer (a) protrudes from the surface of the film formed of the resin in the completed antireflection film and forms a protrusion of an uneven shape.

The layer (a) is cured in the step (2), and thus components contained before curing and after curing are different, but according to the present invention, for convenience, the layer (a) is referred to as the layer (a) at any stage. The layer (a) is also called the layer (a) before and after the steps (3) and (4).

In the step (1), in the coated layer (a), it is preferable that a plurality of the particles (a2) do not align in a direction orthogonal to the surface of the substrate. Here, the expression "the plurality of particles (a2) do not align in the direction orthogonal to the surface of the substrate" indicates that, in a case where 10 μm×10 μm of the in-plane of the substrate is observed with three visual fields with a scanning electron microscope (SEM), the ratio of the number of particles (a2) which do not overlap with each other in the direction orthogonal to the surface is 80% or greater and preferably 95% or greater.

In the step (1), the film thickness of the portion in which the particles (a2) of the layer (a) do not exist is equal to or greater than 0.8 times of the average primary particle diameter of the particles (a2), preferably 0.8 times to 2.0 times, more preferably 0.9 times to 1.5 times, and particularly preferably 1.0 times to 1.2 times. Accordingly, the particles (a2) hardly aggregate, and thus preferable uneven shape can be easily obtained.

[Steps (B1) and (B2)]

The present invention preferably includes a step (B1) of providing a layer (b) including a compound (b1) incompatible with the curable compound (a1) on an opposite surface to an interface on the substrate side of the layer (a) between the step (1) and the step (2), between the step (2) and the step (3), or between the step (3) and the step (4) and a step (B2) of removing the layer (b) after the step (B1).

The step (B1) is preferably included between the steps (1) to (3) and more preferably included between the steps (2) and (3).

The step (B2) is preferably included after the step (4).

(Layer (b))

The layer (b) includes the compound (b1) (also referred to as the "compound (b1)") incompatible with the curable compound (a1).

It is preferable that the layer (b) is provided such that the particles (a2) of the layer (a) do not aggregate and it is preferable that the layer (b) is finally removed.

The expression "the compound (b1) is required to be incompatible with the curable compound (a1)" means that an insoluble matter remains in a case where the compound (b1) is mixed and stirred at 25° C. by 5 mass % with respect to the curable compound (a1).

The compound (b1) is preferably a compound which is not cured by heat. It is preferable that the compound (b1) is a compound which is not cured by heat, since, even in a case where a heating process is included before the compound (b1) is removed in the manufacturing method of the present invention, the moth eye structure can be easily formed with the particles (a2).

In the case where the layer (b) is provided as the compound (b1) by coating, it is preferable that the compound (b1) is a liquid oil component at 50° C. and is more preferably a silicone-based oil component, a hydrocarbon-based oil component, an ester-based oil component, a natural animal and vegetable oils and fats, semisynthetic oils and fats, higher fatty acid, higher alcohols, or a fluorine-based oil component.

[Silicone-Based Oil Component]

The silicone-based oil component may be any one of a solid shape, a semisolid shape, and a liquid shape. As the silicone-based oil component, for example, silicone oil, a silicone-based oil surfactant, a silicone resin, a silicone wax, and a silicone-based gelling agent can be used.

Examples of the silicone oil include low viscosity to high viscosity linear or branched organopolysiloxane such as dimethyl polysiloxane (for example, KF96 series manufactured by Shin-Etsu Chemical Co., Ltd.), tristrimethylsiloxymethylsilane, capryllyl methicone, phenyl trimethicone, tetrakistrimethylsiloxysilane, methylphenyl polysiloxane, methylhexyl polysiloxane, methyl hydrogen polysiloxane, and a dimethylsiloxane.methylphenylsiloxane copolymer; cyclic organopolysiloxane such as octamethyl cyclotetrasiloxane, decamethyl cyclopentasiloxane, dodecamethyl cyclohexasiloxane, tetramethyl tetrahydrogen cyclotetrasiloxane, and tetramethyl tetraphenyl cyclotetrasiloxane; silicone rubber such as amino-modified organopolysiloxane; pyrrolidone-modified organopolysiloxane; pyrrolidone carboxylic acid-modified organopolysiloxane; a gum-like dimethylpolysiloxane having a high degree of polymerization, gum-like amino-modified organopolysiloxane, and a gum-like dimethylsiloxane.methylphenylsiloxane copolymer; silicone gum or a rubber cyclic organopolysiloxane solution; trimethylsiloxysilicic acid, a cyclic siloxane solution of trimethylsiloxysilicic acid (for example, KF-7312J manufactured by Shin-Etsu Chemical Co., Ltd.); higher alkoxy-modified silicone such as stearoxy silicone: higher fatty acid-modified silicone; alkyl modified silicone; long chain alkyl modified silicone; amino acid-modified silicone; fluorine-modified silicone: and a solution of a silicone resin.

Examples of the silicone-based surfactant include linear or branched polyoxyethylene-modified organopolysiloxane, linear or branched polyoxyethylene polyoxypropylene-modified organopolysiloxane, linear or branched polyoxyethylene.alkyl co-modified organopolysiloxane, linear or branched polyoxyethylene polyoxypropylene-alkyl co-modified organopolysiloxane, linear or branched polyglycerin-modified organopolysiloxane, and linear or branched polyglycerol.alkyl co-modified organopolysiloxane (for example, silicone-based surfactants manufactured by Shin-Etsu Chemical Co., Ltd.: KF-6011, 6043, 6028, 6038, 6100, 6104, and 6105). The silicone-based surfactant may be used in a state of coexisting with other oil components such as polyoxyethylene-modified partially crosslinked organopolysiloxane, and polyglycerin-modified partially crosslinked organopolysiloxane (for example, manufactured by Shin-Etsu Chemical Co., Ltd., KSG series: KSG-210, 710, 310, 320, 330, 340, 320Z, 350Z, 810, 820, 830, 840, 820Z, and 850Z).

Examples of the silicone resin include an acrylic silicone resin consisting of an acryl/silicone graft copolymer, an acryl/silicone block copolymer, and the like (specific examples thereof include: a cyclic organopolysiloxane solution of an acryl/silicone graft copolymer: KP-545 manufactured by Shin-Etsu Chemical Co., Ltd.). An acrylic silicone resin containing at least one selected from a pyrrolidone portion, a long chain alkyl portion, a polyoxyalkylene portion, and a fluoroalkyl portion, and an anion portion such as carboxylic acid in a molecule can also be used. The silicone resin is preferably a silicone mesh-shaped compound consisting of at least one of a resin composed of a $R^8_3SiO_{0.5}$ unit and a $SiO_2$ unit, a resin composed of a $R^8_3SiO_{0.5}$ unit, a $R^8_2SiO$ unit, and a $SiO_2$ unit, a resin composed of a $R^8_3SiO_{0.5}$ unit and a $R^8SiO_{1.5}$ unit, a resin composed of a $R^8_3SiO_{0.5}$ unit, a $R^8_2SiO$ unit, and a $R^8SiO_{1.5}$ unit, or a resin composed of a $R^8_3SiO_{0.5}$ unit, a $R^8_2SiO$ unit, a $R^8SiO_{1.5}$ unit, and a $SiO_2$ unit. $R^8$ in the formula is a substituted or unsubstituted monovalent hydrocarbon group having 1 to 30 carbon atoms. A silicone mesh-shaped compound containing at least one selected from a pyrrolidone portion, a long chain alkyl portion, a polyoxyalkylene portion, a polyglycerol portion, a fluoroalkyl portion, and an amino portion in a molecule can be used.

Examples of the silicone wax include an acrylic silicone wax consisting of an acryl/silicone graft copolymer, an acryl/silicone block copolymer, and the like (specific examples thereof include: a cyclic organopolysiloxane solution of an acryl/silicone graft copolymer: KP-561P and 562P manufactured by Shin-Etsu Chemical Co., Ltd.). An acrylic silicone wax containing at least one selected from a pyrrolidone portion, a long chain alkyl portion, a polyoxyalkylene portion, and a fluoroalkyl portion, and an anion portion such as carboxylic acid in a molecule can also be used. The silicone wax is preferably polylactone-modified polysiloxane bonding a polylactone which is a ring-opening polymer of a five or more-membered lactone compound. This silicone wax is a silicone-modified olefin wax obtained by performing addition reaction of an olefin wax having an unsaturated group consisting of α-olefin and diene with organohydrogenpolysiloxane having one or more SiH bonds in one molecule. The above α-olefin is preferably α-olefin having 2 to 12 carbon atoms such as ethylene, propylene, 1-butene, 1-hexene, 4-methyl-1-pentene, and the above diene is preferably butadiene, isoprene, 1,4-hexadiene, vinyl norbornene, ethylidene norbornene, and dicyclopentadiene. As the organohydrogenpolysiloxane having SiH bonds, organohydrogenpolysiloxane having a linear structure, organohydrogenpolysiloxane having a siloxane branched structure, and the like can be used.

Examples of the silicone-based gelling agent include a gel mixture including a gelling component such as an unmodified or modified partially crosslinked organopolysiloxane such as unmodified partially crosslinked organopolysiloxane, alkyl-modified partially crosslinked organopolysiloxane, and silicone branched alkyl modified partially crosslinked organopolysiloxane and various oil components such as cyclopentasiloxane, dimethicone, mineral oil, isododecane, trioctanoin, and squalane. In the gel mixture, the gelling component and the oil component are contained in a coexisting manner. Examples of the gel mixture include KSG series (trade name) manufactured by Shin-Etsu Chemical Co., Ltd., particularly, KSG-15, 16, 41, 42, 43, 44, 042Z, and 045Z (all are trade names).

Examples of the hydrocarbon-based oil component include liquid paraffin, light liquid isoparaffin, heavy flow isoparaffin, vaseline, n-paraffin, isoparaffin, isododecane, isohexadecane, polyisobutylene, hydrogenated polyisobutylene, polybutene, ozokerite, ceresin, microcrystalline wax, paraffin wax, polyethylene wax, polyethylene-polypropylene wax, squalane, squalene, pristane, polyisoprene, and wax.

Examples of the ester-based oil component include hexyldecyl octanoate, cetyl octanoate, isopropyl myristate, isopropyl palmitate, butyl stearate, hexyl laurate, myristyl myristate, oleyl oleate, decyl oleate, octyldodecyl myristate, hexyldecyl dimethyloctanoate, cetyl lactate, myristyl lactate, diethyl phthalate, dibutyl phthalate, lanolin acetate, ethylene glycol monostearate, propylene glycol monostearate, propylene glycol dioleate, glyceryl monostearate, glyceryl monooleate, glyceryl tri-2-ethylhexanoate, trimethylolpropane tri-2-ethylhexanoate, ditrimethylolpropane triethylhexanoate, (isostearic acid/sebacic acid) ditrimethylolpropane, trimethylolpropane trioctanoate, trimethylolpropane triisostearate, diisopropyl adipate, diisobutyl adipate, 2-hexyldecyl adipate, di-2-heptylundecyl adipate, diisostearyl malate, monoisostearic acid hydrogenated castor oil, N-alkyl glycol monoisostearate, octyldodecyl isostearate, isopropyl isostearate, isocetyl isostearate, ethylene glycol di-2-ethylhexanoate, cetyl 2-ethylhexanoate, pentaerythritol tetra-2-ethylhexanoate, octyl dodecyl gum ester, ethyl oleate, octyldodecyl oleate, neopentyl glycol dicaprate, triethyl citrate, 2-ethylhexyl succinate, dioctyl succinate, isocetyl stearate, diisopropyl sebacate, di-2-ethylhexyl sebacate, diethyl sebacate, dioctyl sebacate, dibutyl octyl sebacate, cetyl palmitate, octyldodecyl palmitate, octyl palmitate, 2-ethylhexyl palmitate, 2-hexyldecyl palmitate, 2-heptylundecyl palmitate, cholesteryl 12-hydroxystearate, dipentaerythritol fatty acid ester, 2-hexyldecyl myristate, ethyl laurate, N-lauroyl-L-glutamic acid 2-octyldodecyl ester, N-lauroyl-L-glutamic acid di(cholesteryl/behenyl/octyldodecyl), N-lauroyl-L-glutamic acid di(cholesteryl/octyldodecyl), N-lauroyl-L-glutamic acid di(phytosteryl/behenyl/octyldodecyl), N-lauroyl-L-glutamic acid di(phytosteryl/octyldodecyl), N-lauroylsarcosine isopropyl, diisostearyl malate, neopentyl glycol dioctanoate, isodecyl neopentanoate, isotridecyl neopentanoate, isostearyl neopentanoate, isononyl isononanoate, isotridecyl isononanoate, octyl isononanoate, isotridecyl isononanoate, diene pentane diene pentane diol, dineopentanoic acid methyl pentanediol, octyldodecyl neodecanoate, 2-butyl-2-ethyl-1,3-propanediol dioctanoate, pentaerythrityl tetraoctanoate, hydrogenated rosin pentaerythrityl, pentaerythrityl triethylhexanoate, (hydroxystearic acid/stearic acid/rosin acid) dipentaerythrityl, polyglyceryl tetraisostearate, nona isoestearic acid polyglyceryl-10, deca (erucic acid/isostearic acid/ricinoleic acid) polyglyceryl-8, (hexyldecanoic acid/sebacic acid) diglyceryl oligoester, glycol distearate (ethylene glycol distearate), diisopropyl dimer dilinoleate, diisomer linoleic acid diisostearyl, die merge linoleic acid di(isostearyl/phytosteryl), die marge linoleic acid (phytosteryl/behenyl), die marge linoleic acid (phytosteryl/isostearyl/cetyl/stearyl/behenyl), die merge linoleic acid die merge linoleyl, diisostearic acid dimer linoleyl, die merge linoleyl hydrogenated rosin condensate, die merge linoleic acid hydrogenated castor oil, hydroxyalkyl dimer linoleyl ether, glyceryl tri-isooctanoate, glyceryl triisostearate, glyceryl trimyristate, glyceryl triisopalmitate, glyceryl trioctanoate, glyceryl trioleate, glyceryl diisostearate, tri(caprylic/capric acid) glyceryl, tri(caprylic/capric/myristic/stearic) glyceryl, hydrogenated rosin triglyceride (hydrogenated ester gum), rosin triglyceride (ester gum), glyceryl behenate eicosane diacid, glyceryl di-2-heptylundecanoate, diglyceryl myristate isostearate, cholesteryl acetate, cholesteryl nonanoate, cholesteryl stearate, cholesteryl isostearate, cholesteryl oleate, cholesteryl 12-hydroxystearate, macadamia nut oil fatty acid cholesteryl, macadamia nut oil fatty acid phytosteryl, phytosteryl isostearate, soft lanolin fatty acid cholesteryl, hard lanolin fatty acid cholesteryl, long chain branched fatty acid cholesteryl, long chain α-hydroxy fatty acid cholesteryl, octyldodecyl ricinoleate, lanolin fatty acid octyldodecyl, octyldodecyl erucate, isostearic acid hydrogenated castor oil, avocado oil fatty acid ethyl, and lanolin fatty acid isopropyl.

Examples of the natural animal and vegetable fats and oils and semisynthetic fats and oils include avocado oil, linseed oil, almond oil, ibotarou, eno oil, olive oil, cocoa butter, kapok row, kaya oil, carnauba wax, liver oil, candelilla wax, beef tallow, beef leg fat, beef bone fat, hardened beef tallow, kyunin oil, spermaceti, hydrogenated oil, wheat germ oil, sesame oil, rice germ oil, rice bran oil, sugarcane wax, sasanqua oil, safflower oil, shea butter, synergist oil, cinnamon oil, jojo barrow, olive squalane, shellac wax, turtle oil, soybean oil, tea seed oil, camellia oil, evening primrose oil, corn oil, lard, rapeseed oil, Japanese tung oil, nukaro, germ oil, horse fat, persic oil, palm oil, palm kernel oil, castor oil, hydrogenated castor oil, castor oil fatty acid methyl ester, sunflower oil, grape oil, bayberry row, jojoba oil, hydrogenated jojoba ester, macadamia nut oil, beeswax, mink oil, cotton seed oil, cotton wax, Japan wax, Japan wax kernel oil, montan wax, coconut oil, hardened coconut oil, tri-coconut oil fatty acid glyceride, tamba, peanut oil, lanolin, liquid lanolin, reduced lanolin, lanolin alcohol, hard lanolin, lanolin acetate, lanolin fatty acid isopropyl, polyoxyethylene (POE) lanolin alcohol ether, POE lanolin alcohol acetate, lanolin fatty acid polyethylene glycol, POE hydrogenated lanolin alcohol ether, and egg yolk oil.

Examples of the higher fatty acid include lauric acid, myristic acid, palmitic acid, stearic acid, behenic acid, undecylenic acid, oleic acid, linoleic acid, linolenic acid, arachidonic acid, eicosapentaenoic acid (EPA), docosahexaenoic acid (DHA), isostearic acid, and 12-hydroxystearic acid.

Examples of the higher alcohol include lauryl alcohol, myristyl alcohol, palmityl alcohol, stearyl alcohol, behenyl alcohol, hexadecyl alcohol, oleyl alcohol, isostearyl alcohol, hexyl dodecanol, octyldodecanol, cetostearyl alcohol, 2-decyltetradecinol, cholesterol, sitosterol, phytosterol, lanosterol, POE cholesterol ether, monostearyl glycerin ether (batyl alcohol), and monooleyl glyceryl ether (celkyl alcohol).

Examples of the fluorine-based oil component include perfluoropolyether, perfluorodecalin, and perfluorooctane.

In view of suppressing the aggregation of particle forming a moth eye structure and reducing the muddiness of the antireflection film, the compound (b1) is preferably a liquid at 50° C. and more preferably a liquid at 25° C. At least one of the compounds (b1) preferably has a boiling point of 110° C. or higher. It is preferable that at least one of the compounds (b1) has a boiling point of 110° C. or higher, since it is difficult to be volatilized at room temperature and the layer (b) exists until the curing of layer (a) is completed.

In view of the above, the kinematic viscosity at 25° C. of the compound (b1) having a boiling point of 110° C. or higher is preferably 0.1 $mm^2/s$ to 100,000 $mm^2/s$, more preferably 0.1 $mm^2/s$ to 10,000 $mm^2/s$, and most preferably 0.1 $mm^2/s$ to 100 $mm^2/s$.

The compound (b1) may be used singly or two or more kinds thereof may be used in combination.

The content of the compound (b1) in the layer (b) is preferably 50 to 100 mass %, more preferably 70 to 100 mass %, even more preferably 90 to 100 mass % with respect to the total mass of the layer (b).

In the step (B2), the method of removing the layer (b) is not particularly limited. However, a method of performing washing with a solvent that dissolves the compound (b1) without dissolving the substrate, a method of performing heating at a temperature higher than the boiling point of the compound (b1) and volatilizing the compound (b1), and the like are preferable.

The method for removing the layer (b) is not particularly limited, and a method of using a solvent that dissolves the compound (b1) without dissolving the substrate and the cured layer (a) (for example, washing with the above solvent), a method of volatilizing the compound (b1) by performing heating at a temperature higher than the boiling point of the compound (b1), and a method of dissolving the compound (b1) with an alkaline solution, and the like are preferable.

The solvent that dissolves the compound (b1) without dissolving the substrate and the cured layer (a) is not particularly limited. In a case where the substrate is triacetyl cellulose, an alcohol solvent such as methanol, ethanol, 2-propanol, 1-propanol, n-butanol, isobutanol, diacetone alcohol, and methoxypropanol, a ketone solvent such as methyl isobutyl ketone and methyl butyl ketone, an aromatic solvent such as toluene and xylene, cyclohexane, propylene glycol monomethyl ether acetate, and the like are preferable. A plurality of these solvents may be mixed to be used.

The heating temperature in a case where the compound (b1) is volatilized is preferably a temperature lower than the glass transition temperature of the substrate and higher than the boiling point of the compound (b1), and is specifically 60° C. to 180° C. and more preferably 80° C. to 130° C.

As a solution in a case of being dissolved in an alkaline solution, an aqueous solution of sodium hydroxide or potassium hydroxide is preferably used.

[Step (2)]

The step (2) is a step of curing a portion of the curable compound (a1) in the layer (a) of the step (1) to obtain the cured compound (a1c).

In a case where a portion of the curable compound (a1) is cured in the step (2), the particles (a2) are caused to hardly move such that the aggregation of the particles (a2) can be suppressed.

The expression "a portion of the curable compound (a1) is cured" means that not all of the curable compound (a1) is not cured, but only a portion thereof is cured. In a case where a portion of the curable compound (a1) in the step (2) is cured such that the uncured curable compound (a1) permeates to the substrate by heating in the step (3) or is removed by volatilization, the thickness of the portion in which the particles (a2) of the layer (a) does not exist becomes small, and the particles (a2) are caused to protrude, such that a satisfactory uneven shape (moth eye structure) can be formed.

It is preferable that the curable compound (a1) is a photocurable compound and a portion of the curable compound (a1) is cured by being irradiated with light (preferably ultraviolet ray) in the step (2).

A condition of curing a portion of the curable compound (a1) in the step (2) is preferably a condition in which a curing rate becomes 2% to 20%, more preferably a condition in which a curing rate becomes 3% to 15%, and even more preferably a condition in which a curing rate becomes 5% to 10%, in a case where the substrate is coated with a composition obtained by removing the particles (a2) from the antireflection layer forming composition in a thickness of 2 μm.

The curing rate is (1−the number of remaining polymerizable functional groups after curing/the number of polymerizable functional groups before curing)×100%, and is measured by the following method.

The polymerizable functional group is a group having a polymerizable carbon-carbon unsaturated double bond.

Specifically, NICOLET6700 FT-IR of Thermo electron corporation is used. KBr-IR of the curable compound before curing is measured, a peak (1,660-1,800 $cm^{-1}$) area of the carbonyl group and a peak height (808 $cm^{-1}$) of the polymerizable carbon-carbon unsaturated double bond are determined, a peak of the polymerizable carbon-carbon unsaturated double bond with respect to the carbonyl group peak area is obtained in the same manner as in the IR measurement of single reflection after curing, and peaks before and after ultraviolet ray irradiation are compared, so as to calculate the curing rate. Here, with respect to the calculation of the curing rate, the measured depth at 808 $cm^{-1}$ is regulated as 821 nm, and the depth at 1,660-1,800 $cm^{-1}$ is regulated as 384 nm.

In the step (2), the ultraviolet ray is preferably applied in the irradiation amount of 1 to 90 $mJ/cm^2$, more preferably applied in the irradiation amount of 1.2 to 40 $mJ/cm^2$, and even more preferably applied in the irradiation amount of 1.5 to 10 $mJ/cm^2$.

In the step (2), it is preferable that a portion of the curable compound (a1) is cured by irradiation with the ultraviolet ray from the opposite side of the side having the layer (a) of the substrate. Accordingly, it is possible to cure the area on the substrate side of the layer (a), and the protrusion due to the particles (a2) is easily formed in the subsequent step, while the particles (a2) are caused not to be moved.

It is preferable that the step (2) is performed in the environment of the oxygen concentration of 0.1 to 5.0 volume %, and it is more preferable that the step (2) is performed in the environment of the oxygen concentration of 0.5 to 1.0 volume %. In a case where the oxygen concentration is caused to be in the above range, particularly, the area on the substrate side of the layer (a) can be cured.

The compound (a1c) is a cured product of the curable compound (a1).

The molecular weight of the compound (a1c) is not particularly limited. The compound (a1c) may have an unreacted polymerizable functional group.

[Step (3)]

The step (3) is a step of causing a portion of a compound selected from the group consisting of the curable compound (a1) and the compound (a1c) in the layer (a) to permeate the substrate by heating or to be volatilized so as to form an uneven shape on a surface of the layer (a). Here, the curable compound (a1) that permeates the substrate by heating or is be volatilized is preferably the curable compound (a1) that is not cured in the step (2).

In the step of causing a portion of the compound selected from the group consisting of the curable compound (a1) and the compound (a1c) to permeate the substrate (may be a functional layer in a case where the substrate has a functional layer), it is preferable to heat a laminate having the substrate and the layer (a). It is possible to effectively cause a portion of the compound selected from the group consisting of the curable compound (a1) and the compound (a1c) to permeate the substrate by heating. The temperature in heating is preferably smaller than the glass transition temperature of the substrate. Specifically, the temperature is preferably 60° C. to 150° C. and more preferably 80° C. to 120° C. The heating time is preferably 1 to 15 minutes.

In a case where the above layer (b) is included, the boiling point of the compound (b1) of the layer (b) is preferably a temperature or greater in the heating.

In a case where the step (3) is a step of volatilizing a portion of the compound selected from the group consisting of the curable compound (a1) and the compound (a1c), a boiling point of the curable compound (a1) at 1 atm is preferably 150° C. or lower, and a molecular weight thereof is preferably 300 or less. Specifically, BLEMMER GMR is preferable.

1 atm is 101,325 Pa.

In the step (3), a portion of a compound selected from the group consisting of the curable compound (a1) and the compound (a1c) in the layer (a) permeates the substrate by heating or is volatilized so as to form an uneven shape on a surface of the layer (a). The protrusion of this uneven shape is each of the particles (a2) and the recessed part is a compound that remains in the layer (a) and is selected from the group consisting of the curable compound (a1) and the compound (a1c).

[Step (4)]

The step (4) is a step of curing a compound selected from the group consisting of the curable compound (a1) and the compound (a1c) that remains in the layer (a).

The curing in the step (4) is preferably photocuring, and is more preferably curing by the ultraviolet ray irradiation. The irradiation amount of the ultraviolet ray is preferably 300 mJ/cm2 or greater, and it is preferable that the curing is performed in the environment of the oxygen concentration of 0.01 volume % or less.

In the step (4), the compound that is selected from the group consisting of the curable compound (a1) and the compound (a1c) and that remains in the layer (a) is cured so as to obtain a resin, and an antireflection layer is formed having a moth eye structure formed of an uneven shape with this resin as a recessed part and the particles (a2) protruding from the resin as protrusions.

After the step (4), it is preferable that a plurality of the particles (a2) do not exist in a direction orthogonal to the surface of the substrate.

After the step (4), the average surface roughness Ra is preferably 15 nm or greater, more preferably 30 nm or greater, and most preferably 40 nm or greater.

<Other Layers>

As described above, other layers may be provided between the substrate and the layer (a). In this case, a laminate formed of the substrate and the other layers is called a substrate. Examples of the other layers include various functional layers, but a hard coat layer is particularly preferable.

[Hard Coat Layer]

The hard coat layer is preferably formed by the cross-linking reaction of the curable compound or the polymerization reaction. For example, the hard coat layer is preferably formed by coating the substrate with a hard coat layer forming composition including a polyfunctional monomer or a polyfunctional oligomer and subjecting the polyfunctional monomer or the polyfunctional oligomer to crosslinking reaction or polymerization reaction.

As the functional group (polymerizable group) of the polyfunctional monomer or the polyfunctional oligomer, those having light, electron beams, or radiation polymerizability are preferable. Among them, a photopolymerizable (preferably, ultraviolet ray polymerizable) functional group is preferable.

Examples of the photopolymerizable functional group include unsaturated polymerizable functional groups such as a (meth)acryloyl group, a vinyl group, a styryl group, and an allyl group. Among them, a (meth)acryloyl group is preferable.

With respect to the curable compound in the hard coat layer, disclosure in [0021] to [0027] of JP2014-240956A can be referred to this present invention.

In view of applying sufficient durability and impact resistance to the film, the film thickness of the hard coat layer is usually about 0.6 μm to 50 μm and preferably 5 μm to 20 μm.

The strength of the hard coat layer is preferably H or greater and more preferably 2H or greater in the pencil hardness test. In the Taber test according to JIS K 5600-5-4 (1999), it is preferable that the abrasion amount of the test piece before and after the test is small.

In a case where the hard coat layer is provided, for example, in a case where the pencil hardness test is performed, scratches on a plastic substrate (cellulose acylate or acrylic substrate) can be further prevented.

It is preferable that the hard coat layer contains a curable compound, and the curable compound of the hard coat layer is not cured in the step (2). Accordingly, a portion of the compound selected from the group consisting of the curable compound (a1) and the compound (a1c) in the layer (a) in the step (3) easily permeates the hard coat layer.

In order to cause the curable compound of the hard coat layer not to be cured in the step (2), the following aspect can be exemplified. In the following aspect, the curable compound included in the hard coat layer forming composition and the antireflection layer forming composition is a photocurable compound. In the step (3), a portion of the curable compound (a1) of the layer (a) permeates the hard coat layer by heating.

The hard coat layer is formed by curing the hard coat layer forming composition containing the curable compound, and the increase amount of the curing rate due to curing in the step (2) is preferably less than 5%, more preferably less than 3%, and most preferably less than 1.5%.

Aspect 1: Aspect of containing a photoradical polymerization initiator A in the hard coat layer forming composition and containing the photoradical polymerization initiator A in the antireflection layer forming composition In this aspect, the substrate is coated with the hard coat layer forming composition, irradiation with a ultraviolet ray is performed in a comparatively weak exposure amount, a portion of the photoradical polymerization initiator A is cleaved to generate radicals, and a portion thereof is not cleaved. At this point, a portion of the curable compound of the hard coat layer is cured. Thereafter, the hard coat layer is coated with the antireflection layer forming composition, and a portion of the curable compound (a1) is cured in the step (2). Thereafter, a portion of the uncured curable compound (a1) permeates the hard coat layer in the step (3), irradiation with the ultraviolet rays is performed in the step (4), and the curable compound of the hard coat layer and the uncured curable compound (a1) are cured.

Aspect 2: Aspect of containing a photoradical polymerization initiator A and a thermal radical polymerization initiator that generates radicals by heat in the hard coat layer forming composition and containing the photoradical polymerization initiator A in the antireflection layer forming composition In this aspect, the substrate is coated with the hard coat layer forming composition, irradiation with a ultraviolet ray is performed in a comparatively weak exposure amount, and almost all of the photoradical polymerization initiator A is cleaved to generate radicals. At this point, a portion of the curable compound of the hard coat layer is cured. Thereafter, the hard coat layer is coated with the antireflection layer forming composition, and a portion of the curable compound (a1) is cured in the step (2). Thereafter, a portion of the uncured curable compound (a1) permeates the hard coat layer in the step (3), irradiation with the ultraviolet rays is performed in the step (4), and the uncured curable compound (a1) is cured. Thereafter, the thermal polymerization initiator in the hard coat layer is cleaved by heating so as to generate radicals, and the curable compound is cured. The temperature for generating radicals from the thermal radical polymerization initiator is preferably higher than the permeating temperature in the step (3) and is preferably, for example, 100° C. to 180° C. As the thermal radical polymerization initiator, VF-096 and VAm-11 (above, manufactured by Wako Pure Chemical Industries, Ltd), and the like can be suitably used.

Aspect 3: Aspect of containing the photoradical polymerization initiator A that generates radicals by irradiating the hard coat layer forming composition with ultraviolet rays by using a lamp A and containing the photoradical polymerization initiator A and a photoradical polymerization initiator B that generates radicals by being irradiated with ultraviolet rays by using a lamp B in the antireflection layer forming composition In this aspect, the substrate is coated with the hard coat layer forming composition, irradiation with a ultraviolet ray is performed in a comparatively weak exposure amount by using the lamp A, a portion of the photoradical polymerization initiator A is consumed, and a portion thereof remains. At this point, a portion of the curable compound of the hard coat layer is cured. Thereafter, the hard coat layer is coated with the antireflection layer forming composition, irradiation with ultraviolet rays is performed by using the lamp B in the step (2), and a portion of the curable compound (a1) is cured. Thereafter, a portion of the uncured curable compound (a1) permeates the hard coat layer in the step (3), irradiation with the ultraviolet rays is performed by using the lamp A in the step (4), and the curable compound of the hard coat layer and the uncured curable compound (a1) are cured. Examples of the combination of the lamp A and the photoradical polymerization initiator A include a high pressure mercury lamp with a strong specific wavelength spectrum and IRGACURE 907 or IRGACURE 369. Examples of the combination of the lamp B and the photoradical polymerization initiator B include a metal halide lamp having a relatively broad wavelength spectrum and IRGACURE 127 or IRGACURE 184. It is preferable to shift a cleavage wavelength of the initiator using UV-LED light having a relatively long wavelength.

Aspect 4: Aspect of containing a thermal radical polymerization initiator that generates radicals by heat in the hard coat layer forming composition and containing the photoradical polymerization initiator A in the antireflection layer forming composition In this aspect, the substrate is coated with the hard coat layer forming composition, a portion of the thermal radical polymerization initiator is consumed by applying a little heat, and a portion thereof remains. At this point, a portion of the curable compound of the hard coat layer is cured. Thereafter, the hard coat layer is coated with the antireflection layer forming composition, irradiation with ultraviolet rays is performed in the step (2), and a portion of the curable compound (a1) is cured. Thereafter, a portion of the uncured curable compound (a1) permeates the hard coat layer in the step (3), irradiation with the ultraviolet rays is performed in the step (4), and the uncured curable compound (a1) is cured. Thereafter, radicals are generated by the thermal radical polymerization initiator in the hard coat layer by heating, and the curable compound is cured. The temperature for generating radicals from the thermal radical polymerization initiator is preferably higher than the permeating temperature in the step (3) and is preferably, for example, 100° C. to 180° C.

[Antireflection Film]

The antireflection film of the present invention is an antireflection film including a substrate; and an antireflection layer having an uneven shape on a surface, the antireflection layer contains a resin that forms a recessed part of the uneven shape and a particle having an average primary particle diameter of 150 nm to 250 nm that forms a protrusion, an average surface roughness Ra of the uneven shape of the antireflection layer measured by using an atomic force microscope is 15 nm or greater, in a cross section of the antireflection film in a film thickness direction, an angle θ formed by a straight line perpendicular to the substrate that passes through a point P at which one of the particles, the resin, and the air interface intersect with each other and a tangent line of a curve formed by the resin and the air interface at the point P is 5° or greater, and in the antireflection film, a difference between an integrated reflectance and a specular reflectance in a wavelength range of 450 nm to 650 nm is 0.6% or less.

The antireflection film according to the present invention can be obtained by the method of manufacturing of the antireflection film according to the present invention, but the present invention is not limited thereto.

The substrate is as described above.

The resin for forming a recessed part of the uneven shape of the antireflection layer is preferably a cured product of a compound selected from the group consisting of the curable compound (a1) and the compound (a1c).

The preferable range of the particles for forming the protrusions of the uneven shape of the antireflection layer is the same as the particles (a2) described above.

The uneven shape included in the surface of the antireflection layer of the antireflection film according to the present invention is preferably a moth eye structure.

(Moth Eye Structure)

The moth eye structure refers to a surface obtained by processing of a substance (material) for suppressing reflection of light and a structure of having a periodic microstructure pattern. Particularly, in a case of having the purpose of suppressing reflection of visible light, the moth eye structure refers to a structure having a microstructure pattern with a period of less than 780 nm. It is preferable that the period of the microstructure pattern is less than 380 nm, the color of reflected light becomes small. It is preferable that the periodicity of the uneven shape of the moth eye structure is 100 nm or greater, light having a wavelength of 380 nm can recognize a microstructure pattern and is excellent in antireflection properties. Whether the moth eye structure exists can be checked by observing the surface shape with a scanning electron microscope (SEM), an atomic force microscope (AFM) or the like, and checking whether the microstructure pattern is formed.

An average surface roughness Ra of the uneven shape of the antireflection layer measured by using an atomic force microscope is preferably 15 nm to 150 nm. In a case where the average surface roughness Ra is less than 15 nm, the surface uneven shape is not formed and the reflectance can not be reduced. In a case where the average surface roughness Ra is greater than 150 nm, the cycle of unevenness formed from the particles becomes large, and the reflectance in the visible light region cannot be reduced. The average surface roughness Ra is more preferably 30 nm to 100 nm, and most preferably 40 nm to 80 nm.

As the method of measuring the average surface roughness Ra, a visual field of 5 μm×5 μm is measured at a 256×256 measurement point in an AFM measurement mode in an atomic force microscope (AFM: Atomic Force Microscope, SPI3800N, manufactured by Seiko Instruments Inc.), first order inclination correction and second order inclination correction are performed, and surface roughness analysis was performed, so as to calculate an average surface roughness Ra.

Figure 2A:
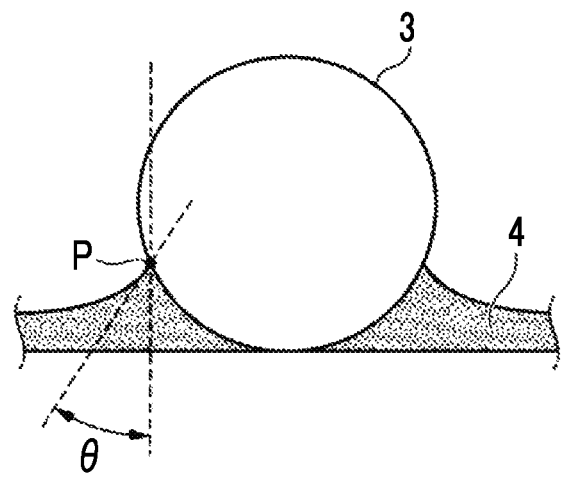
FIGS. 2A and 2B are schematic views for describing θ.
Figure 2B:
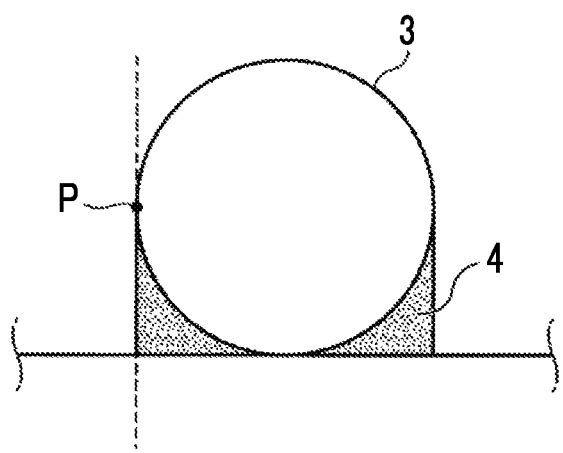

In the antireflection film, an angle θ formed by a straight line perpendicular to the substrate that passes through a point P at which the particle, the resin, and the air interface intersect with each other and a tangent line of a curve formed by the resin and the air interface at the point P is 5° or greater (see FIG. 2A). Accordingly, the resin can maintain a particle, and rub resistance can be secured. θ is more preferably 10° or greater and most preferably 30° or greater. Meanwhile, with respect to the antireflection film manufactured by etching in the related art, θ becomes about 0° (see FIG. 2B).

In the antireflection film according to the present invention, it is preferable that a difference between an integrated reflectance and a specular reflectance in a wavelength range of 450 nm to 650 nm is 0.6% or less.

In a case where the difference between the integrated reflectance and the specular reflectance in a wavelength range of 450 nm to 650 nm is caused to be in the above range, it is possible to obtain an antireflection film having small muddiness.

The integrated reflectance and the specular reflectance are measured in the following method.

The back surface of the antireflection film (substrate side) is treated with a sand paper, so as to obtain a film sample from which back surface reflection is removed.

(Integrated Reflectance)

The unit IRV-471 is mounted to a spectrophotometer V-550 (manufactured by JASCO Corporation), the reflectance is measured in the wavelength range of 450 to 650 nm, and the average reflectance is taken as integrated reflectance.

The integrated reflectance of the antireflection film is particularly preferably 1.2% or less.

(Specular Reflectance)

The unit ARM-500V is mounted to a spectrophotometer V-550 (manufactured by JASCO Corporation), the reflectance is measured in the wavelength range of 450 to 650 nm at an incidence angle of 5°, and the average reflectance is taken as a specular reflectance.

The integrated reflectance-specular reflectance is set as a difference between the integrated reflectance and the specular reflectance.

A specific method of causing the average surface roughness Ra and θ of the antireflection layer and the difference between the integrated reflectance and the specular reflectance of the antireflection film to be in the above ranges is to perform manufacturing in the above method of manufacturing the antireflection film according to the present invention.

Figure 3:
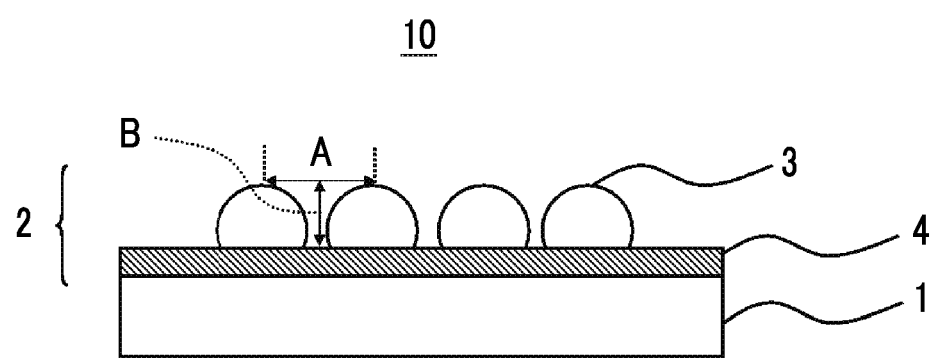
FIG. 3 is a cross-sectional schematic view illustrating an example of an antireflection film of the present invention.

An example of a preferable embodiment of an antireflection film of the present invention is illustrated in FIG. 3.

An antireflection film 10 in FIG. 3 has a substrate 1 and an antireflection layer 2. The antireflection layer 2 has a moth eye structure formed of an uneven shape formed of a particle 3 having an average primary particle diameter of 150 nm to 250 nm on a surface on the opposite side of a substrate 1.

The antireflection layer 2 includes the particle 3 having an average primary particle diameter of 150 nm to 250 nm and a resin 4.

Though not illustrated in FIG. 3, other layers may be provided between the substrate and the antireflection layer, and it is preferable to have a hard coat layer.

Materials of the substrate, the antireflection layer, and the hard coat layer in the antireflection film are the same as in the method of manufacturing the antireflection film according to the present invention.

In the uneven shape of the antireflection layer of the antireflection film, B/A which is the ratio of a distance A between the peaks of the adjacent protrusions and a distance B between the center between the peaks of the adjacent protrusions and the recessed part is preferably 0.5 or greater, more preferably 0.6 or greater, and even more preferably 0.7 or greater. In a case where B/A is 0.5 or greater, the refractive index gradient layer in which the depth of the recessed part is greater than the distance between the protrusions and the refractive index gradually changes from the air to the inside of the antireflection layer can be formed, and thus the reflectance can be further reduced.

B/A can be controlled by the volume ratio of the resin and the particle in the antireflection layer after curing. Therefore, it is important to appropriately design the formulation ratio of the resin and the particle. In a case where the resin permeates the substrate in the step of preparing the moth eye structure or is volatilized, the volume ratio of the resin and the particle in the antireflection layer becomes different from the formulation ratio in the composition for forming the antireflection layer, and thus the matching with the substrate is appropriately set.

It is preferable that the particles for forming protrusions are spread evenly at an appropriate filling rate. In view of the above, the content of the inorganic particle for forming the protrusions is preferably adjusted such that the inorganic particle is uniform over the entire antireflection layer. The filling rate can be measured as the area occupation ratio (particle occupancy ratio) of the inorganic particle located on the most surface side in a case of observing the inorganic particle for forming the protrusions from the surface by SEM or the like, and is preferably 25% to 64%, more preferably 25% to 50%, and still more preferably 30% to 45%.

The antireflection film manufactured by the manufacturing method of the present invention can be suitably used as a polarizing plate protective film.

The polarizing plate protective film using the antireflection film manufactured by the manufacturing method of the present invention can be bonded to a polarizer to form a polarizing plate and can be suitably used for a liquid crystal display device and the like.

Examples

Hereinafter, the present invention is specifically described with reference to examples. Materials, reagents, substance amounts, and proportions thereof, operations, and the like shown in the following examples can be appropriately changed without departing from the gist of the present invention. Therefore, the scope of the present invention is not limited to the following specific examples.

(Preparation of Substrate 1)

(Acetyl Substitution Degree)

An acetyl substitution degree of cellulose acylate is measured in the following method.

The acetyl substitution degree is measured in conformity with ASTM D-817-91.

(Preparation of Air Layer Cellulose Ester Solution)

The following composition was put into a mixing tank and stirred while heating, and respective components were dissolved, so as to prepare an air layer cellulose ester solution.

Composition of Air Layer Cellulose Ester Solution

| | |
|---|---|
| Cellulose ester (acetyl substitution degree 2.86) | 100 parts by mass |
| Sugar ester compound of Formula (I) | 3 parts by mass |
| Sugar ester compound of Formula (II) | 1 part by mass |
| Silica particle dispersion (average particle diameter 16 nm) "AEROSIL R972", manufactured by Nippon Aerosil Co., Ltd. | 0.026 parts by mass |

-continued

| | |
|---|---|
| Methylene chloride | 377 parts by mass |
| Methanol | 61 parts by mass |
| Butanol | 2.6 parts by mass |

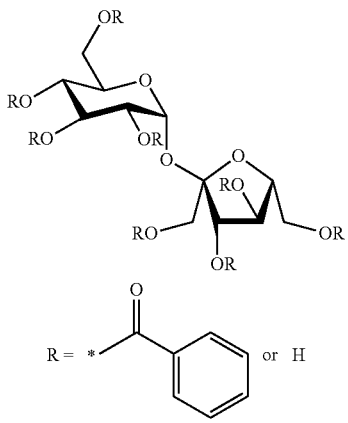

Formula (I)

Average Substitution Degree of R=5.5

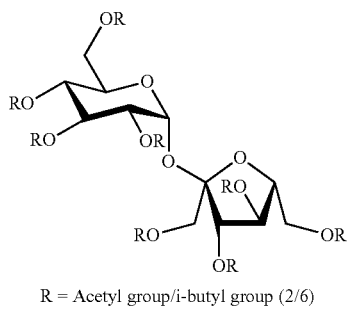

Formula (II)

R = Acetyl group/i-butyl group (2/6)

(Preparation of Drum Layer Cellulose Ester Solution)

The following composition was put into a mixing tank and stirred while heating, and respective components were dissolved, so as to prepare a drum layer cellulose ester solution.

Composition of Drum Layer Cellulose Ester Solution

| | |
|---|---|
| Cellulose ester (acetyl substitution degree 2.86) | 100 parts by mass |
| Sugar ester compound of Formula (I) | 3 parts by mass |
| Sugar ester compound of Formula (II) | 1 part by mass |
| Silica particle dispersion (average particle diameter 16 nm) "AEROSIL R972", manufactured by Nippon Aerosil Co., Ltd. | 0.091 parts by mass |
| Methylene chloride | 339 parts by mass |
| Methanol | 74 parts by mass |
| Butanol | 3 parts by mass |

(Preparation of Core Layer Cellulose Ester Solution)

The following composition was put into a mixing tank and stirred while heating, and respective components were dissolved, so as to prepare a core layer cellulose ester solution.

Composition of Core Layer Cellulose Ester Solution

| | |
|---|---|
| Cellulose ester (acetyl substitution degree 2.86) | 100 parts by mass |
| Sugar ester compound of Formula (I) | 8.3 parts by mass |
| Sugar ester compound of Formula (II) | 2.8 parts by mass |
| Methylene chloride | 266 parts by mass |
| Methanol | 58 parts by mass |
| Butanol | 2.6 parts by mass |

(Film Formation by Co-Casting)

A device set to be capable of forming a film having a three-layer structure was used by mounting a feed block adjusted for co-casting as a casting die. The air layer cellulose ester solution, the core layer cellulose ester solution, and the drum layer cellulose ester solution were cooled to −7° C. and co-casted from a casting port to a drum. At this point, the flow rate of each dope was adjusted such that that the thickness ratio became air layer/core layer/drum layer=7/90/3.

Each dope was cast on a mirror surface stainless steel support which was a drum having a diameter of 3 m. Dry air at 34° C. was applied to the drum at 300 m³/min.

Then, the casted and rotated cellulose ester film was peeled off from the drum at 50 cm from the end point of the casting portion, and both ends were pinched with a pin tenter. At the time of peeling, stretching of 8% was performed in the transportation direction (longitudinal direction).

A cellulose ester web maintained with a pin tenter was transported to a drying zone. Dry air at 45° C. was blown in the first drying and then was blown at 110° C. for 5 minutes. At this point, the cellulose ester web was transported while stretching in the transverse direction at a magnification of 10%.

After the web was detached from the pin tenter, the portion maintained with the pin tenter was cut continuously, and unevenness at a height of 10 μm was provided at both ends of the web in the width direction with a width of 15 mm. The width of the web at this point was 1,610 mm. Drying was performed at 140° C. for 10 minutes while a tension of 130 N was applied in the transportation direction. Further, end portions in the width direction were continuously cut such that the web had a desired width, so as to prepare the substrate 1 having a film thickness of 60 μm. At this point, the film thicknesses of the end portions in the width direction cut off after drying at 140° C. and the central portion of the web were the same.

FUJITAC TG60UL is a cellulose acylate film manufactured by Fujifilm Corporation.

(Preparation of Substrate with Hard Coat Layer)

<Forming of Hard Coat Layer A, Hard Coat Layer B, Hard Coat Layer D, Hard Coat Layer E, and Hard Coat Layer F>

The substrate presented in Table 1 was coated with a coating liquid forming hard coat layer A, B, D, E, or F in the following composition, the coating liquid was adjusted by nitrogen purge such that the oxygen concentration became 1.0 volume %, and the coating liquid was cured by being irradiated with a ultraviolet ray in an irradiation amount presented in Table 1 by an air cooling metal halide lamp, so as to form a hard coat layer having a film thickness of 8 μm.

<Forming of Hard Coat Layer C>

The substrate was coated with the coating liquid for forming the hard coat layer C in the following composition, and the coating liquid was heated at 150° C. for 90 seconds and cured, so as to form a hard coat layer having a film thickness of 8 μm.

(Composition of Coating Liquid for Forming Hard Coat Layer A)

| | |
|---|---|
| A-TMMT | 44.58 parts by mass |
| IRGACURE 127 | 1.86 parts by mass |
| Methyl ethyl ketone | 35.71 parts by mass |
| Methyl isobutyl ketone | 8.93 parts by mass |
| Methyl acetate | 8.93 parts by mass |

(Composition of Coating Liquid for Forming Hard Coat Layer B)

| | |
|---|---|
| A-TMMT | 33.60 parts by mass |
| IRGACURE 127 | 1.40 parts by mass |
| Methyl ethyl ketone | 35.75 parts by mass |
| Methyl acetate | 29.25 parts by mass |

(Composition of Coating Liquid for Forming Hard Coat Layer C)

| | |
|---|---|
| A-TMMT | 33.60 parts by mass |
| VF-096 | 1.40 parts by mass |
| Methyl ethyl ketone | 35.75 parts by mass |
| Methyl acetate | 29.25 parts by mass |

(Composition of Coating Liquid for Forming Hard Coat Layer D)

| | |
|---|---|
| A-TMMT | 33.39 parts by mass |
| VF-096 | 1.40 parts by mass |
| IRGACURE 127 | 0.21 parts by mass |
| Methyl ethyl ketone | 35.75 parts by mass |
| Methyl acetate | 29.25 parts by mass |

(Composition of Coating Liquid for Forming Hard Coat Layer E)

| | |
|---|---|
| PET-30 | 33.39 parts by mass |
| VF-096 | 1.40 parts by mass |
| IRGACURE 127 | 0.21 parts by mass |
| Methyl ethyl ketone | 35.75 parts by mass |
| Methyl acetate | 29.25 parts by mass |

(Composition of Coating Liquid for Forming Hard Coat Layer F)

| | |
|---|---|
| PET-30 | 33.39 parts by mass |
| IRGACURE 127 | 1.40 parts by mass |
| Methyl ethyl ketone | 35.75 parts by mass |
| Methyl acetate | 29.25 parts by mass |

A-TMMT: Pentaerythritol tetraacrylate (manufactured by Shin-Nakamura Chemical Co., Ltd.)

PET-30: A mixture of 60% pentaerythritol triacrylate and 40% pentaerythritol tetraacrylate (KAYARAD PET30 (manufactured by Nippon Kayaku Co., Ltd.))

IRGACURE 127: Photopolymerization initiator (manufactured by BASF SE)

VF-096: 2,2'-azobis[N-(2-propenyl)-2-methylpropionamide]: Thermal polymerization initiator (Preparation of Antireflection Layer Forming Coating Liquid)

Each component was introduced to a mixing tank so as to have the composition in Table 2, was stirred for 60 minutes, was dispersed by an ultrasonic disperser for 30 minutes, and was filtrated with a polypropylene filter having a pore diameter of 5 μm to obtain an antireflection layer forming coating liquid.

(Composition of Coating Liquid for Forming Antireflection Layer A)

| | |
|---|---|
| Compound A | 0.97 parts by mass |
| Compound B | 8.73 parts by mass |
| Ethanol | 15.26 parts by mass |
| Methyl ethyl ketone | 33.45 parts by mass |
| Acetone | 15.26 parts by mass |
| IRGACURE 127 | 0.40 parts by mass |
| Silica particle dispersion α | 25.88 parts by mass |
| Compound C | 0.04 parts by mass |

(Composition of Coating Liquid for Forming Antireflection Layer B)

| | |
|---|---|
| DPHA | 0.97 parts by mass |
| BLEMMER GMR | 8.73 parts by mass |
| Ethanol | 15.26 parts by mass |
| Methyl ethyl ketone | 33.45 parts by mass |
| Acetone | 15.26 parts by mass |
| IRGACURE 127 | 0.40 parts by mass |
| Silica particle dispersion α | 25.88 parts by mass |
| Compound C | 0.04 parts by mass |

(Composition of Coating Liquid for Forming Antireflection Layer C)

| | |
|---|---|
| Compound A | 0.95 parts by mass |
| Compound B | 8.55 parts by mass |
| Ethanol | 15.26 parts by mass |
| Methyl ethyl ketone | 33.45 parts by mass |
| Acetone | 15.26 parts by mass |
| IRGACURE 907 | 0.40 parts by mass |
| IRGACURE 184 | 0.20 parts by mass |
| Silica particle dispersion α | 25.88 parts by mass |
| Compound C | 0.04 parts by mass |

(Composition of Coating Liquid for Forming Antireflection Layer D)

| | |
|---|---|
| Sirius-501 | 2.52 parts by mass |
| Compound B | 1.07 parts by mass |
| KBM-4803 | 7.37 parts by mass |
| Ethanol | 15.26 parts by mass |
| Methyl ethyl ketone | 32.19 parts by mass |
| Acetone | 15.26 parts by mass |
| IRGACURE 127 | 0.40 parts by mass |
| Silica particle dispersion α | 25.88 parts by mass |
| Compound C | 0.04 parts by mass |

(Composition of Coating Liquid for Forming Antireflection Layer E)

| | |
|---|---|
| Sirius-501 | 2.47 parts by mass |
| Compound B | 1.05 parts by mass |
| KBM-4803 | 7.22 parts by mass |
| Ethanol | 15.26 parts by mass |
| Methyl ethyl ketone | 32.22 parts by mass |
| Acetone | 15.26 parts by mass |
| IRGACURE 907 | 0.40 parts by mass |
| IRGACURE 184 | 0.20 parts by mass |
| Silica particle dispersion α | 25.88 parts by mass |
| Compound C | 0.04 parts by mass |

(Composition of Coating Liquid for Forming Antireflection Layer F)

| | |
|---|---|
| Sirius-501 | 2.52 parts by mass |
| Compound B | 3.88 parts by mass |
| KBM-4803 | 4.56 parts by mass |
| Ethanol | 15.26 parts by mass |
| Methyl ethyl ketone | 32.19 parts by mass |
| Acetone | 15.26 parts by mass |
| IRGACURE 127 | 0.40 parts by mass |
| Silica particle dispersion α | 25.88 parts by mass |
| Compound C | 0.04 parts by mass |

(Composition of Coating Liquid for Forming Antireflection Layer G)

| | |
|---|---|
| Sirius-501 | 2.47 parts by mass |
| Compound B | 3.80 parts by mass |
| KBM-4803 | 4.47 parts by mass |
| Ethanol | 15.26 parts by mass |
| Methyl ethyl ketone | 32.22 parts by mass |
| Acetone | 15.26 parts by mass |
| IRGACURE 907 | 0.40 parts by mass |
| IRGACURE 184 | 0.20 parts by mass |
| Silica particle dispersion α | 25.88 parts by mass |
| Compound C | 0.04 parts by mass |

(Composition of Coating Liquid for Forming Antireflection Layer H)

| | |
|---|---|
| Compound A | 0.97 parts by mass |
| Compound B | 8.73 parts by mass |
| Ethanol | 15.26 parts by mass |
| Methyl ethyl ketone | 33.45 parts by mass |
| Acetone | 15.26 parts by mass |
| IRGACURE 127 | 0.40 parts by mass |
| Silica particle dispersion β | 25.88 parts by mass |
| Compound C | 0.04 parts by mass |

(Composition of Coating Liquid for Forming Antireflection Layer I)

| | |
|---|---|
| Compound A | 0.97 parts by mass |
| Compound B | 8.73 parts by mass |
| Ethanol | 15.26 parts by mass |
| Methyl ethyl ketone | 33.45 parts by mass |
| Acetone | 15.26 parts by mass |
| IRGACURE 127 | 0.40 parts by mass |
| Silica particle dispersion γ | 25.88 parts by mass |
| Compound C | 0.04 parts by mass |

Compound A: U-15HA

Compound B: X-12-1048

Compound C: A MEK solution of polymer (weight-average molecular weight 19,000) of the following structure having a concentration of a solid content of 40 mass %

SP-13

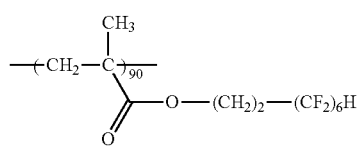
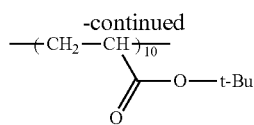

Silica particle dispersions α, β, and γ were respectively prepared in the following method.

(Preparation of Silica Particle Dispersion α)

KE-P20 was calcined at 1,050° C. for one hour in an electric furnace, was cooled, and was pulverized using a pulverizer. 5 kg of the calcined KE-P20 was introduced to a Henschel mixer (FM20J model manufactured by Nippon Coke & Engineering Co., Ltd.) having a capacity of 20 L equipped with a heating jacket. A solution obtained by dissolving 45 g of 3-acryloxypropyltrimethoxysilane (KBM 5103 manufactured by Shin-Etsu Chemical Co., Ltd.) in 90 g of methyl alcohol was added dropwise to a portion in which the calcined KE-P20 was stirred and mixed. Thereafter, the temperature was raised to 150° C. over about one hour while mixing and stirring, and the mixture was maintained at 150° C. for 12 hours, and the heat treatment was performed. During the heat treatment, the scraping device was constantly rotated in the direction opposite to the stirring blade, deposits on the wall were scraped off. If necessary, the deposits on the wall were scraped off with a spatula. After heating, cooling was performed, and disintegration and classification were performed by using a jet pulverization classifier, so as to obtain a silane coupling agent surface-treated silica particle. An acryloyl group was provided to the surface of this particle.

80 parts by mass of MEK and 20 parts by mass of the silica particle were introduced to a mixing tank, were stirred for 10 minutes, and were subjected to ultrasonic dispersion for 30 minutes while stirring was continued, so as to prepare the silica particle dispersion α having 20 mass % of concentration of solid contents.

The average primary particle diameter of the silica particle included in the silica particle dispersion α was 180 nm.

(Preparation of Silica Particle Dispersion β)

KE-P30 was calcined at 1,050° C. for one hour in an electric furnace, was cooled, and was pulverized using a pulverizer. 5 kg of the calcined KE-P30 was introduced to a Henschel mixer (FM20J model manufactured by Nippon Coke & Engineering Co., Ltd.) having a capacity of 20 L equipped with a heating jacket. A solution obtained by dissolving 30 g of 3-acryloxypropyltrimethoxysilane (KBM 5103 manufactured by Shin-Etsu Chemical Co., Ltd.) in 90 g of methyl alcohol was added dropwise to a portion in which the calcined KE-P30 was stirred and mixed. Thereafter, the temperature was raised to 150° C. over about one hour while mixing and stirring, and the mixture was maintained at 150° C. for 12 hours, and the heat treatment was performed. During the heat treatment, the scraping device was constantly rotated in the direction opposite to the stirring blade, deposits on the wall were scraped off. If necessary, the deposits on the wall were scraped off with a spatula. After heating, cooling was performed, and disintegration and classification were performed by using a jet pulverization classifier, so as to obtain a silane coupling agent surface-treated silica particle. An acryloyl group was provided to the surface of this particle.

80 parts by mass of MEK and 20 parts by mass of the silica particle were introduced to a mixing tank, were stirred for 10 minutes, and were subjected to ultrasonic dispersion for 30 minutes while stirring was continued, so as to prepare the silica particle dispersion β having 20 mass % of concentration of solid contents.

The average primary particle diameter of the silica particle included in the silica particle dispersion β was 290 nm.

(Preparation of Silica Particle Dispersion γ)

PL-7 (manufactured by Fuso Chemical Co., Ltd.) was calcined at 1,050° C. for one hour in an electric furnace, was cooled, and was pulverized using a pulverizer. 5 kg of the calcined PL-7 was introduced to a Henschel mixer (FM20J model manufactured by Nippon Coke & Engineering Co., Ltd.) having a capacity of 20 L equipped with a heating jacket. A solution obtained by dissolving 65 g of 3-acryloxypropyltrimethoxysilane (KBM 5103 manufactured by Shin-Etsu Chemical Co., Ltd.) in 90 g of methyl alcohol was added dropwise to a portion in which the calcined PL-7 was stirred and mixed. Thereafter, the temperature was raised to 150° C. over about one hour while mixing and stirring, and the mixture was maintained at 150° C. for 12 hours, and the heat treatment was performed. During the heat treatment, the scraping device was constantly rotated in the direction opposite to the stirring blade, deposits on the wall were scraped off. If necessary, the deposits on the wall were scraped off with a spatula. After heating, cooling was performed, and disintegration and classification were performed by using a jet pulverization classifier, so as to obtain a silane coupling agent surface-treated silica particle. An acryloyl group was provided to the surface of this particle.

80 parts by mass of MEK and 20 parts by mass of the silica particle were introduced to a mixing tank, were stirred for 10 minutes, and were subjected to ultrasonic dispersion for 30 minutes while stirring was continued, so as to prepare the silica particle dispersion γ having 20 mass % of concentration of solid contents.

The average primary particle diameter of the silica particle included in the silica particle dispersion γ was 100 nm.

IRGACURE 184: Photopolymerization initiator (manufactured by BASF SE)

IRGACURE 907: Photopolymerization initiator (manufactured by BASF SE)

Sirius-501: Dendrimer-type polyfunctional acrylate (manufactured by Osaka Organic Chemical Industry Ltd.)

KBM-4803: Glycidoxy octyltrimethoxysilane (manufactured by Shin-Etsu Chemical Co., Ltd.)

DPHA: KAYARD DPHA (manufactured by Nippon Kayaku Co., Ltd.) A mixture of dipentaerythritol hexaacrylate and dipentaerythritol heptaacrylate KE-P20: SEAHOSTAR KE-P20 (average primary particle diameter 200 nm, amorphous silica manufactured by Nippon Shokubai Co., Ltd.)

KE-P30: SEAHOSTAR KE-P30 (average primary particle diameter 300 nm, amorphous silica manufactured by Nippon Shokubai Co., Ltd.)

PL-7: QUARTRON PL-7 Ultra high purity colloidal silica (average primary particle diameter 100 nm, manufactured by Fuso Chemical Industry Co., Ltd.)

BLEMMER GMR: Glycerin dimethacrylate (manufactured by NOF Corporation)

[Step (1) Application of Antireflection Layer Forming Coating Liquid]

The hard coat layer of the substrate with a hard coat layer was coated with an antireflection layer forming coating liquid at 2.8 ml/m$^2$ by using a gravure coater and was dried at 30° C. for 90 seconds at room temperature.

A portion of the sample was cut out, irradiated with 600 mJ/cm$^2$ by an air cooling metal halide lamp and cured, and cut with a microtome to obtain a cross section, and SEM observation was performed at 5,000 times, so as to measure the thickness of the resin with respect to the particle.

[Step (2)]

Ultraviolet ray irradiation was performed with an irradiation direction, a lamp type, an irradiation amount, an oxygen concentration (volume %) described in the step (2) in Table 3, so as to obtain curing rates as presented in Table 3.

M04-L41 manufactured by Eye Graphics Co., Ltd. was used as the air cooling metal halide lamp.

As the high-pressure mercury lamp, type: 33351N and a model number: LAMP-HOZ 200 D24 U 450 E manufactured by Dr. Honle AG was used.

With respect to the measurement of the irradiation amount, HEAD SENSER PD-365 was mounted on an eye ultraviolet ray integrating accumulation light meter UV METER UVPF-A1 manufactured by Eye Graphics, Inc. and measurement was performed in a measurement range of 0.0.

In Table 3, the expression "from the antireflection layer side" indicates light irradiation from the antireflection layer side, and the expression "from the substrate side" indicates light irradiation from the opposite side to the interface on the antireflection layer side of the substrate.

In Comparative Examples 1 and 2, the step (2) was not performed.

In Comparative Example 2, the surface of the resin layer obtained in a step (4) described below was subjected to a plasma treatment in the condition of 13.56 MHz by using a high frequency plasma device, the resin was etched, and an uneven shape became apparent on the surface. The plasma treatment was performed by applying high frequency of 50 W for 30 seconds under the condition of a pressure of 2.7 Pa while gas of composition of oxygen:argon=1:1 (volume ratio) was introduced.

(Oil Coating)

In Table 3, with respect to an example of "with oil coating", the antireflection layer was coated with an oil liquid in the following composition (all are silicone oil manufactured by Shin-Etsu Chemical Co., Ltd.) to a thickness of 600 nm by using a die coater.

Composition of oil liquid

| | |
|---|---|
| KF96-10cs | 30.0 parts by mass |
| KF96-0.65cs | 70.0 parts by mass |

[Step (3)]

A treatment was performed for five minutes at 120° C. or 150° C., a portion of the curable compound permeated the substrate or was volatilized.

In Examples 1 and 6 using BLEMMER GMR as a curable compound, a portion of the curable compound was volatilized. In the other embodiments, a portion of the curable compound permeated the substrate.

[Step (4)]

While nitrogen purge was performed such that the oxygen concentration became less than 0.01 volume %, irradiation with an ultraviolet ray of 600 mJ/cm2 was performed by using the air cooling metal halide lamp described above, and the curable compound of the antireflection layer was cured to obtain a resin.

A portion of the prepared antireflection film sample was cut out with a microtome to obtain a cross section, and SEM observation was performed at 5,000 times, so as to measure the thickness of the resin (a portion in which particles did not exist) with respect to the particle. Comparison was performed to the SEM observation image after the step (1), those in which the thickness of the resin was reduced by 0.4 times of the particle diameter were determined that a portion of the curable compound permeated the substrate or was volatilized in the step (3).

(Oil Removal)

The example in which oil coating was performed was immersed in methyl isobutyl ketone, methyl isobutyl ketone was poured thereto, so as to remove oil.

(Heating Treatment)

With respect to the example of containing a thermal polymerization initiator in a hard coat layer forming composition, after the step (4), a heat treatment was performed at 150° C. for five minutes, so as to cure the hard coat layer.

TABLE 1

| | Support | Hard coat layer Prescription Hard coat type | Polymerization initiator | Curing condition Lamp type | Irradiation amount [mJ/cm²] | Oxygen concentration | Heating |
|---|---|---|---|---|---|---|---|
| Comparative Example 1 | FUJITAC TG60UL | Hard coat type B | Irgacure 127 | Air cooling metal halide lamp | 20 | 1% | |
| Comparative Example 2 | FUJITAC TG60UL | Hard coat type A | Irgacure 127 | Air cooling metal halide lamp | 100 | 1% | |
| Example 1 | FUJITAC TG60UL | Hard coat type A | Irgacure 127 | Air cooling metal halide lamp | 100 | 1% | |
| Example 2 | FUJITAC TG60UL | Hard coat type B | Irgacure 127 | Air cooling metal halide lamp | 20 | 1% | |
| Example 3 | FUJITAC TG60UL | Hard coat type D | Irgacure 127 + VF 096 | Air cooling metal halide lamp | 1000 | 1% | |
| Example 4 | FUJITAC TG60UL | Hard coat type B | Irgacure 127 | Air cooling metal halide lamp | 20 | 1% | |
| Example 5 | FUJITAC TG60UL | Hard coat type C | VF096 | — | — | — | 150° C. 90 seconds |
| Example 6 | Substrate 1 | Hard coat layer A | Irgacure 127 | Air cooling metal halide lamp | 100 | 1% | |
| Example 7 | Substrate 1 | Hard coat layer B | Irgacure 127 | Air cooling metal halide lamp | 20 | 1% | |
| Example 8 | Substrate 1 | Hard coat layer D | Irgacure 127 + VF 096 | Air cooling metal halide lamp | 1000 | 1% | |
| Example 9 | Substrate 1 | Hard coat layer B | Irgacure 127 | Air cooling metal halide lamp | 20 | 1% | |
| Example 10 | Substrate 1 | Hard coat layer C | VF096 | — | — | — | 150° C. 90 seconds |
| Example 11 | Substrate 1 | Hard coat layer E | Irgacure 127 + VF 096 | Air cooling metal halide lamp | 1000 | 1% | |
| Example 12 | Substrate 1 | Hard coat layer F | Irgacure 127 | Air cooling metal halide lamp | 20 | 1% | |
| Example 13 | Substrate 1 | Hard coat layer B | Irgacure 127 | Air cooling metal halide lamp | 20 | 1% | |
| Example 14 | Substrate 1 | Hard coat layer D | Irgacure 127 + VF 096 | Air cooling metal halide lamp | 1000 | 1% | |
| Example 15 | Substrate 1 | Hard coat layer B | Irgacure 127 | Air cooling metal halide lamp | 20 | 1% | |
| Example 16 | Substrate 1 | Hard coat layer E | Irgacure 127 + VF 096 | Air cooling metal halide lamp | 1000 | 1% | |
| Example 17 | Substrate 1 | Hard coat layer F | Irgacure 127 | Air cooling metal halide lamp | 20 | 1% | |
| Comparative Example 3 | Substrate 1 | Hard coat layer D | Irgacure 127 + VF 096 | Air cooling metal halide lamp | 1000 | 1% | |
| Comparative Example 4 | Substrate 1 | Hard coat layer D | Irgacure 127 + VF 096 | Air cooling metal halide lamp | 1000 | 1% | |
| Comparative Example 5 | Substrate 1 | Hard coat layer D | Irgacure 127 + VF 096 | Air cooling metal halide lamp | 1000 | 1% | |
| Comparative Example 6 | Substrate 1 | Hard coat layer D | Irgacure 127 + VF 096 | Air cooling metal halide lamp | 1000 | 1% | |

TABLE 2

| | Antireflection layer Prescription | Particle diameter | Particle surface treatment | Curable compound | Polymerization initiator |
|---|---|---|---|---|---|
| Comparative Example 1 | Antireflection layer A | 180 nm | KBM-5103 | U-15HA/X-12-1048 | IRGACURE 127 |
| Comparative Example 2 | Antireflection layer A | 180 nm | KBM-5103 | U-15HA/X-12-1048 | IRGACURE 127 |
| Example 1 | Antireflection layer B | 180 nm | KBM-5103 | DPHA/BLEMMER GMR | IRGACURE 127 |
| Example 2 | Antireflection layer A | 180 nm | KBM-5103 | U-15HA/X-12-1048 | IRGACURE 127 |
| Example 3 | Antireflection layer A | 180 nm | KBM-5103 | U-15HA/X-12-1048 | IRGACURE 127 |
| Example 4 | Antireflection layer C | 180 nm | KBM-5103 | U-15HA/X-12-1048 | IRGACURE 907 + IRGACURE 184 |

TABLE 2-continued

| | Antireflection layer Prescription | Particle diameter | Particle surface treatment | Curable compound | Polymerization initiator |
|---|---|---|---|---|---|
| Example 5 | Antireflection layer A | 180 nm | KBM-5103 | U-15HA/X-12-1048 | IRGACURE 127 |
| Example 6 | Antireflection layer B | 180 nm | KBM-5103 | DPHA/BLEMMER GMR | IRGACURE 127 |
| Example 7 | Antireflection layer A | 180 nm | KBM-5103 | U-15HA/X-12-1048 | IRGACURE 127 |
| Example 8 | Antireflection layer A | 180 nm | KBM-5103 | U-15HA/X-12-1048 | IRGACURE 127 |
| Example 9 | Antireflection layer C | 180 nm | KBM-5103 | U-15HA/X-12-1048 | IRGACURE 907 + IRGACURE 184 |
| Example 10 | Antireflection layer A | 180 nm | KBM-5103 | U-15HA/X-12-1048 | IRGACURE 127 |
| Example 11 | Antireflection layer D | 180 nm | KBM-5103 | Sirius-501/X-12-1048/KBM-4803 | IRGACURE 127 |
| Example 12 | Antireflection layer E | 180 nm | KBM-5103 | Sirius-501/X-12-1048/KBM-4803 | IRGACURE 907 + IRGACURE 184 |
| Example 13 | Antireflection layer A | 180 nm | KBM-5103 | U-15HA/X-12-1048 | IRGACURE 127 |
| Example 14 | Antireflection layer A | 180 nm | KBM-5103 | U-15HA/X-12-1048 | IRGACURE 127 |
| Example 15 | Antireflection layer C | 180 nm | KBM-5103 | U-15HA/X-12-1048 | IRGACURE 907 + IRGACURE 184 |
| Example 16 | Antireflection layer F | 180 nm | KBM-5103 | Sirius-501/X-12-1048/KBM-4803 | IRGACURE 127 |
| Example 17 | Antireflection layer G | 180 nm | KBM-5103 | Sirius-501/X-12-1048/KBM-4803 | IRGACURE 907 + IRGACURE 184 |
| Comparative Example 3 | Antireflection layer H | 290 nm | KBM-5103 | U-15HA/X-12-1048 | IRGACURE 127 |
| Comparative Example 4 | Antireflection layer I | 100 nm | KBM-5103 | U-15HA/X-12-1048 | IRGACURE 127 |
| Comparative Example 5 | Antireflection layer A | 180 nm | KBM-5103 | U-15HA/X-12-1048 | IRGACURE 127 |
| Comparative Example 6 | Antireflection layer A | 180 nm | KBM-5103 | U-15HA/X-12-1048 | IRGACURE 127 |

TABLE 3

| | Step (2) | | | | | | | Step (4) | | | | |
|---|---|---|---|---|---|---|---|---|---|---|---|---|
| | Irradiation direction | Lamp type | Irradiation amount [mJ/cm²] | Oxygen concentration | Curing rate of layer (a) [%] | Increase amount of curing rate of hard coat layer [%] | Oil coating | Step (3) | Lamp type | Irradiation amount | Oxygen concentration | Oil removal | Heating treatment |
| Comparative Example 1 | — | — | — | — | — | — | Without | 120° C. 5 minutes | Air cooling metal halide lamp | 600 mJ | 100 ppm or less | Without | Without |
| Comparative Example 2 | — | — | — | — | — | — | Without | 120° C. 5 minutes | Air cooling metal halide lamp | 600 mJ | 100 ppm or less | Without | Without |
| Example 1 | From antireflection layer side | Air cooling metal halide lamp | 20 | 1% | 18 | 4.8 | Without | 150° C. 5 minutes | Air cooling metal halide lamp | 600 mJ | 100 ppm or less | Without | Without |
| Example 2 | From antireflection layer side | Air cooling metal halide lamp | 2.0 | 1% | 12 | 4.5 | Without | 120° C. 5 minutes | Air cooling metal halide lamp | 600 mJ | Less than 100 ppm or less | Without | Without |
| Example 3 | From antireflection layer side | Air cooling metal halide lamp | 2.0 | 1% | 12 | 1.2 | Without | 120° C. 5 minutes | Air cooling metal halide lamp | 600 mJ | 100 ppm or less | Without | 150° C. 5 minutes |
| Example 4 | From antireflection layer side | High pressure mercury lamp | 2.0 | 1% | 7 | 1.6 | Without | 120° C. 5 minutes | Air cooling metal halide lamp | 600 mJ | 100 ppm or less | Without | Without |
| Example 5 | From antireflection layer side | Air cooling metal halide lamp | 2.0 | 1% | 12 | 1.8 | Without | 120° C. 5 minutes | Air cooling metal halide lamp | 600 mJ | 100 ppm or less | Without | 150° C. 5 minutes |
| Example 6 | From substrate side | Air cooling metal halide lamp | 20 | 1% | 15 | 4.5 | Without | 150° C. 5 minutes | Air cooling metal halide lamp | 600 mJ | 100 ppm or less | Without | Without |

TABLE 3-continued

| | Step (2) | | | | | | | Step (4) | | | | |
|---|---|---|---|---|---|---|---|---|---|---|---|---|
| | Irradiation direction | Lamp type | Irradiation amount [mJ/cm²] | Oxygen concentration | Curing rate of layer (a) [%] | Increase amount of curing rate of hard coat layer [%] | Oil coating | Step (3) | Lamp type | Irradiation amount | Oxygen concentration | Oil removal | Heating treatment |
| Example 7 | From substrate side | Air cooling metal halide lamp | 2.0 | 1% | 8 | 3.8 | Without | 120° C. 5 minutes | Air cooling metal halide lamp | 600 mJ | 100 ppm or less | Without | Without |
| Example 8 | From substrate side | Air cooling metal halide lamp | 2.0 | 1% | 8 | 0.6 | Without | 120° C. 5 minutes | Air cooling metal halide lamp | 600 mJ | 100 ppm or less | Without | 150° C. 5 minutes |
| Example 9 | From substrate side | High pressure mercury lamp | 2.0 | 1% | 6 | 1.3 | Without | 120° C. 5 minutes | Air cooling metal halide lamp | 600 mJ | 100 ppm or less | Without | Without |
| Example 10 | From substrate side | Air cooling metal halide lamp | 2.0 | 1% | 8 | 1.6 | Without | 120° C. 5 minutes | Air cooling metal halide lamp | 600 mJ | 100 ppm or less | Without | 150° C. 5 minutes |
| Example 11 | From substrate side | Air cooling metal halide lamp | 2.0 | 1% | 8 | 0.1 | Without | 120° C. 5 minutes | Air cooling metal halide lamp | 600 mJ | 100 ppm or less | Without | 150° C. 5 minutes |
| Example 12 | From substrate side | High pressure mercury lamp | 2.0 | 1% | 7 | 0.8 | Without | 120° C. 5 minutes | Air cooling metal halide lamp | 600 mJ | 100 ppm or less | Without | Without |
| Example 13 | From substrate side | Air cooling metal halide lamp | 1.5 | 1% | 8 | 2.9 | With | 120° C. 5 minutes | Air cooling metal halide lamp | 600 mJ | 100 ppm or less | With | Without |
| Example 14 | From substrate side | Air cooling metal halide lamp | 1.5 | 1% | 8 | 0.2 | With | 120° C. 5 minutes | Air cooling metal halide lamp | 600 mJ | 100 ppm or less | With | 150° C. 5 minutes |
| Example 15 | From substrate side | High pressure mercury lamp | 1.5 | 1% | 6 | 1.0 | With | 120° C. 5 minutes | Air cooling metal halide lamp | 600 mJ | 100 ppm or less | With | Without |
| Example 16 | From substrate side | Air cooling metal halide lamp | 1.5 | 1% | 8 | 0.0 | With | 120° C. 5 minutes | Air cooling metal halide lamp | 600 mJ | 100 ppm or less | With | 150° C. 5 minutes |
| Example 17 | From substrate side | High pressure mercury lamp | 1.5 | 1% | 7 | 0.5 | With | 120° C. 5 minutes | Air cooling metal halide lamp | 600 mJ | 100 ppm or less | With | Without |
| Comparative Example 3 | From substrate side | Air cooling metal halide lamp | 1.5 | 1% | 8 | 0.2 | Without | 120° C. 5 minutes | Air cooling metal halide lamp | 600 mJ | 100 ppm or less | Without | 150° C. 5 minutes |
| Comparative Example 4 | From substrate side | Air cooling metal halide lamp | 1.5 | 1% | 8 | 0.2 | Without | 120° C. 5 minutes | Air cooling metal halide lamp | 600 mJ | 100 ppm or less | Without | 150° C. 5 minutes |
| Comparative Example 5 | From substrate side | Air cooling metal halide lamp | 100 | 1% | 35 | 7.6 | Without | 120° C. 5 minutes | Air cooling metal halide lamp | 600 mJ | 100 ppm or less | Without | 150° C. 5 minutes |
| Comparative Example 6 | From substrate side | Air cooling metal halide lamp | 0.5 | 1% | 1 | 0.0 | Without | 120° C. 5 minutes | Air cooling metal halide lamp | 600 mJ | 100 ppm or less | Without | 150° C. 5 minutes |

TABLE 4

|  | Step (1) Thickness with respect to particle of layer (a) [times] | Step (4) Thickness with respect to particle of layer (a) [times] |
|---|---|---|
| Comparative Example 1 | 1.1 | 0.2 |
| Comparative Example 2 | 1.1 | 0.2 |
| Example 1 | 0.8 | 0.4 |
| Example 2 | 1.1 | 0.4 |
| Example 3 | 1.1 | 0.4 |
| Example 4 | 1.2 | 0.1 |
| Example 5 | 1.1 | 0.3 |
| Example 6 | 0.8 | 0.4 |
| Example 7 | 1.1 | 0.2 |
| Example 8 | 1.3 | 0.1 |
| Example 9 | 1.1 | 0.1 |
| Example 10 | 1.1 | 0.2 |
| Example 11 | 1.2 | 0.3 |
| Example 12 | 1.1 | 0.3 |
| Example 13 | 1.0 | 0.4 |
| Example 14 | 1.1 | 0.3 |
| Example 15 | 1.0 | 0.2 |
| Example 16 | 1.1 | 0.1 |
| Example 17 | 1.2 | 0.1 |
| Comparative Example 3 | 0.8 | 0.3 |
| Comparative Example 4 | 1.2 | 0.5 |
| Comparative Example 5 | 1.2 | 1.1 |
| Comparative Example 6 | 1.1 | 0.1 |

[Black Tightness]

An antireflection film was attached to a surface of iPad (registered trademark) manufactured by Apple Inc. through a pressure sensitive adhesive, and the black tightness was evaluated in the state of power off. A direction perpendicular to the surface of the display under sunlight was set to 0° and evaluation was performed from a 45° direction.

A: Blackness was strong, and the screen was looked to be tightly closed.

B: Slight muddiness was felt overall.

C: Strong muddiness was present.

[Steel Wool Resistance]

A rubbing test was performed on the antireflection layer surface of the antireflection film under the following conditions by using a rubbing tester so as to obtain an index of scratch resistance.

Evaluation environment condition: 25° C., relative humidity: 60%

Rubbing material: Steel wool (manufactured by Nippon Steel Wool Co., Ltd., Gerade No. 0000)

A band was wrapped around a rubbing tip portion (1 cm×1 cm) of the tester in contact with the sample and was fixed Travel distance (one way): 13 cm, Rubbing speed: 13 cm/sec, Load: 200 g/cm$^2$, Tip portion contact area: 1 cm×1 cm, Number of rubbing: 5 round trips Oily black ink was applied to the back side of the rubbed sample and visually observed with reflected light, so as to evaluate scratches on the scrubbed portion.

A: The number of scratches was within 5

B: The number of scratches was 6 to 15

C: The number of scratches was greater than 16

[Integrated Reflectance and Specular Reflectance]

The back surface of the antireflection film (substrate side) is treated with a sand paper, so as to obtain a film sample from which back surface reflection is removed.

(Integrated Reflectance)

The unit IRV-471 is mounted to a spectrophotometer V-550 (manufactured by JASCO Corporation), the reflectance is measured in the wavelength range of 450 to 650 nm, and the average reflectance is taken as integrated reflectance.

(Specular Reflectance)

The unit ARM-500V is mounted to a spectrophotometer V-550 (manufactured by JASCO Corporation), the reflectance is measured in the wavelength range of 450 to 650 nm at an incidence angle of 5°, and the average reflectance is taken as a specular reflectance.

The integrated reflectance-specular reflectance is set as a difference between the integrated reflectance and the specular reflectance.

[Average Surface Roughness Ra]

As the method of measuring the average surface roughness Ra, a visual field of 5 μm×5 μm is measured at a 256×256 measurement point in an AFM measurement mode in an atomic force microscope (AFM: Atomic Force Microscope, SPI3800N, manufactured by Seiko Instruments Inc.), first order inclination correction and second order inclination correction are performed, and surface roughness analysis was performed, so as to calculate an average surface roughness Ra.

[Curing Rate of Layer (a)]

The curing rate is the curing rate in a case where the substrate was coated with the composition from which a particle is removed from the antireflection layer forming composition in a thickness of 2 μm and the composition was cured, is a curing rate in a case where irradiation was performed in the same irradiation direction, the same lamp type, the same irradiation amount, and the same oxygen concentration by using the same substrate as in a case where irradiation was performed in the step (2), and is defined by the following formula.

(1−the number of remaining polymerizable functional groups after curing)/the number of polymerizable functional groups before curing×100%

The polymerizable functional group is a group having a polymerizable carbon-carbon unsaturated double bond.

Specifically, NICOLET6700 FT-IR of Thermo electron corporation is used, KBr-IR of the curable compound before curing is measured, a peak (1,660-1,800 cm$^{-1}$) area of the carbonyl group and a peak height (808 cm$^{-1}$) of the polymerizable carbon-carbon unsaturated double bond are determined, a peak of the polymerizable carbon-carbon unsaturated double bond with respect to the carbonyl group peak area is obtained in the same manner as in the IR measurement of single reflection after curing, and peaks before and after ultraviolet ray irradiation are compared, so as to calculate the curing rate. Here, with respect to the calculation of the curing rate, the measured depth at 808 cm$^{-1}$ was regulated as 821 nm, and the depth at 1,660-1,800 cm$^{-1}$ was regulated as 384 nm.

[Increase Amount of Curing Rate of Hard Coat Layer]

The curing rate of the hard coat layer is defined by the curing rate after irradiation of the hard coat layer—the curing rate before irradiation. The curing rate before irradiation is a curing rate in the state before step (1), and the curing rate after irradiation is a curing rate in a case where irradiation was performed in the same irradiation direction, the same lamp type, the same irradiation amount, and the same oxygen concentration as the case where irradiation is performed in the step (2) without providing the layer (a). The curing rate was measured in the above method.

[θ]

Metal vapor deposition was performed on the surface of an antireflection film (sample), the sample surface was embedded by using an epoxy adhesive, the sample was cut into flakes (thickness: 100 nm or less) by using a cryo-ion slicer (Ar ion beam cutting, cooling), and observation was performed using a transmission electron microscope (accelerating voltage 100 kV), so as to obtain an image of cross section in the film thickness direction. From the obtained image, five angles formed by a straight line perpendicular to the substrate that passes through a point P at which the particle, the resin, and the air interface intersect with each other and a tangent line of a curve formed by the resin and the air interface at the point P were obtained, and an average thereof was set as θ.

[Confirmation Whether Plurality of Particles Exist in Direction Orthogonal to Surface of Substrate]

400 μm$^2$ of the antireflection film surface was observed with SEM in the magnification of 5,000 times, and it was checked whether particles were overlapped with each other in the direction orthogonal to the surface of the substrate. Among the overlapping particles, the number of particles far from the substrate was counted. In a case where this number was within 5, it was assumed that a plurality of particles did not exist in the direction orthogonal to the surface of the substrate. Evaluation results were 0 in all examples and comparative examples.

TABLE 5

|  | Integrated reflectance | Integrated reflectance-specular reflectance | Black tightness | Ra [nm] | θ[°] | Steel wool resistance |
| --- | --- | --- | --- | --- | --- | --- |
| Comparative Example 1 | 1.4% | 0.8% | C | 12 | 27 | A |
| Comparative Example 2 | 0.6% | 0.1% | A | 48 | 0 | C |
| Example 1 | 1.2% | 0.6% | B | 27 | 73 | A |
| Example 2 | 1.2% | 0.5% | B | 25 | 58 | A |
| Example 3 | 1.0% | 0.5% | B | 35 | 28 | A |
| Example 4 | 0.9% | 0.6% | B | 42 | 28 | A |
| Example 5 | 1.1% | 0.5% | B | 38 | 15 | A |
| Example 6 | 0.9% | 0.4% | B | 35 | 37 | A |
| Example 7 | 0.9% | 0.2% | B | 41 | 26 | A |
| Example 8 | 0.8% | 0.4% | B | 43 | 38 | A |
| Example 9 | 0.8% | 0.4% | B | 34 | 42 | A |
| Example 10 | 0.9% | 0.5% | B | 30 | 55 | A |
| Example 11 | 0.8% | 0.3% | A | 39 | 24 | A |
| Example 12 | 0.9% | 0.2% | A | 38 | 58 | A |
| Example 13 | 1.1% | 0.6% | B | 16 | 35 | A |
| Example 14 | 0.8% | 0.3% | A | 32 | 27 | A |
| Example 15 | 0.8% | 0.2% | A | 39 | 38 | A |
| Example 16 | 0.7% | 0.3% | A | 48 | 47 | A |
| Example 17 | 0.6% | 0.1% | A | 45 | 56 | A |
| Comparative Example 3 | 1.3% | 0.7% | C | 15 | 32 | A |
| Comparative Example 4 | 1.5% | 0.3% | B | 8 | 22 | B |
| Comparative Example 5 | 3.7% | 0.2% | B | 2 | 90 | A |
| Comparative Example 6 | 1.4% | 1.2% | C | 21 | 12 | B |

According to the present invention, it is possible to provide a method capable of easily producing an antireflection film in which antireflection performance is satisfactory, scratch resistance is excellent, muddiness is little, and black tightness is excellent even in a bright environment and this antireflection film.

The present invention has been described in detail and with reference to specific embodiments, but it is obvious to those skilled in the art that various changes and modifications can be made without departing from the spirit and scope of the invention.

What is claimed is:

1. A method of manufacturing an antireflection film, comprising the successive steps of:
   a step (1) of applying a composition including a curable compound (a1), a plurality of particles (a2) having an average primary particle diameter of 150 nm to 250 nm, and a solvent on a substrate, and volatilizing the solvent to provide a layer (a), the layer (a) having a portion between the particles (a2), and the portion having a thickness being 0.8 times the average primary particle diameter of the particles (a2) or greater;
   a step (2) of curing a portion of the curable compound (a1) in the layer (a) to obtain a cured compound (a1 c);
   a step (3) of causing a portion of a compound selected from the group consisting of the curable compound (a1) and the compound (a1c) in the layer (a) to permeate the substrate by heating or to be volatilized so as to form an uneven shape on a surface of the layer (a); and
   a step (4) of curing the curable compound (a1) that remains in the layer (a),
   wherein in step (4) a thickness of the portion between the particles (a2) with respect to the particle diameter is 0.4 times or less.

2. The method of manufacturing an antireflection film according to claim 1,
   wherein, after the step (4), the particles (a2) do not align in a direction orthogonal to a surface of the substrate.

3. The method of manufacturing an antireflection film according to claim 1,
   wherein the condition of curing a portion of the curable compound (a1) in the step (2) is a condition in which 2% to 20% of a composition in which the particles (a2) are removed from the composition and being applied on the substrate in a thickness of 2 μm is cured.

4. The method of manufacturing an antireflection film according to claim 1,
   wherein the curing a portion of the curable compound (a1) in the step (2) is performed by irradiating with ultraviolet rays from a side of the surface opposite to a side having the layer (a) of the substrate.

5. The method of manufacturing an antireflection film according to claim 1,
   wherein the curable compound (a1) is a compound having two or more (meth)acryloyl groups in one molecule.

6. The method of manufacturing an antireflection film according to claim 1,
wherein the particles (a2) are metal oxide particles.

7. The method of manufacturing an antireflection film according to claim 1,
wherein a heating temperature in a case of permeation by heating of the step (3) is 60° C. to 150° C.

8. The method of manufacturing an antireflection film according to claim 7,
wherein a heating time during the heating is 1 to 15 minutes.

9. The method of manufacturing an antireflection film according to claim 1, further comprising:
a step (B1) of providing a layer (b) including a compound (b1) incompatible with the curable compound (a1) on a surface of the layer (a) opposite to a surface on the substrate side between the step (1) and the step (2), between the step (2) and the step (3), or between the step (3) and the step (4); and
a step (B2) of removing the layer (b) after the step (B1).

10. The method of manufacturing an antireflection film according to claim 9,
wherein the compound (b1) is an oil component that is a liquid at 50° C.

11. The method of manufacturing an antireflection film according to claim 9,
wherein the compound (b1) is a silicone-based oil component, a hydrocarbon-based oil component, an ester-based oil component, natural animal fats, natural vegetable oils, semisynthetic oils and fats, higher fatty acid, higher alcohol, or a fluorine-based oil component.

12. The method of manufacturing an antireflection film according to claim 1,
wherein the substrate has a hard coat layer and the composition in the step (1) is applied on the hard coat layer.

13. The method of manufacturing an antireflection film according to claim 12,
wherein the hard coat layer is formed by curing a hard coat layer forming composition containing a curable compound, and an increase amount of a curing rate of the hard coat layer forming composition due to curing of the step (2) is less than 5%.

14. The method of manufacturing an antireflection film according to claim 13,
wherein at least two kinds of curable compounds are used as the curable compound (a1), and at least one kind thereof is a compound that permeates the substrate in the step (3), does not have a radical reactive group, and has a reactive group other than a radical reactive group.

15. An antireflection film manufactured by the method of manufacturing an antireflection film according to claim 1.

16. An antireflection film comprising:
a substrate; and
an antireflection layer having an uneven shape on a surface,
wherein the antireflection layer contains a resin that forms a recessed part of the uneven shape and a plurality of particles having an average primary particle diameter of 150 nm to 250 nm that forms a protrusion,
wherein an average surface roughness (Ra) of the uneven shape of the antireflection layer measured by using an atomic force microscope is 15 nm or greater,
wherein, in a cross section of the antireflection film in a film thickness direction, an angle θ formed by a straight line perpendicular to the substrate that passes through a point (P) at which one of the particles, the resin, and an air interface intersect with each other and a tangent line of a curve formed by the resin and the air interface at the point (P) is 5° or greater and 73° or less, and
wherein, in the antireflection film, a difference between an integrated reflectance and a specular reflectance in a wavelength range of 450 nm to 650 nm is 0.6% or less.

* * * * *